US012343897B2

(12) United States Patent
Vandenberg et al.

(10) Patent No.: US 12,343,897 B2
(45) Date of Patent: Jul. 1, 2025

(54) BLADED PLUG CUTTING TOOL AND RELATED METHOD OF USE

(71) Applicant: National Nail Corp., Grand Rapids, MI (US)

(72) Inventors: Roger A. Vandenberg, Hudsonville, MI (US); Todd E. A. Schwartzkopf, Hudsonville, MI (US); Christopher M. Colyn, Grandville, MI (US)

(73) Assignee: National Nail Corp., Grand Rapids, MI (US)

( * ) Notice: Subject to any disclaimer, the term of this patent is extended or adjusted under 35 U.S.C. 154(b) by 295 days.

(21) Appl. No.: 18/200,959

(22) Filed: May 23, 2023

(65) Prior Publication Data

US 2024/0391133 A1 Nov. 28, 2024

(51) Int. Cl.

| | |
|---|---|
| ***B27M 3/28*** | (2006.01) |
| ***B27B 5/12*** | (2006.01) |
| *B25F 3/00* | (2006.01) |

(52) U.S. Cl.

CPC ................. *B27M 3/28* (2013.01); *B27B 5/12* (2013.01); *B25F 3/00* (2013.01)

(58) Field of Classification Search

CPC ............... B27M 3/00; B27B 5/12; B27G 1/00

See application file for complete search history.

(56) References Cited

U.S. PATENT DOCUMENTS 2,615,245 A * 10/1952 Schaumleffel ......... B26D 1/445 30/316
5,401,125 A * 3/1995 Sevack ................... B23B 51/04 408/203.5
5,810,524 A * 9/1998 Wirth, Jr. ................ B23B 51/04 408/206
6,099,214 A * 8/2000 Lee ......................... B23B 51/04 408/206
6,273,652 B1 * 8/2001 Wirth, Jr. ................ B23B 51/04 408/205
6,599,065 B2 * 7/2003 Haughton ............... B23B 51/04 408/203.5
7,367,768 B2 5/2008 McGovern et al.

(Continued)

OTHER PUBLICATIONS https://www.fastenmaster.com/products/cortex-for-decking, downloaded Sep. 29, 2023.

(Continued)

*Primary Examiner* — Matthew Katcoff

(74) *Attorney, Agent, or Firm* — Warner Norcross + Judd LLP

(57) ABSTRACT

A plug cutting tool that produces plugs having an aesthetic exterior surface common to a donor board. The tool can include a tool axis; a carrier that rotates about the tool axis; and a blade which is joined with the carrier and which includes a first cutting edge moveable along a first extension axis transverse to the tool axis as the blade rotates about the tool axis. The first cutting edge angles toward and moves closer to the tool axis as the first cutting edge bores a groove in a donor board. The first cutting edge can advance into the donor board to produce the groove surrounding a plug having a plug face, a plug bottom, and a plug sidewall inwardly tapered from the plug face to the plug bottom so that the plug face has a greater dimension than the plug bottom. A related method of use is provided.

20 Claims, 15 Drawing Sheets

(56) References Cited

U.S. PATENT DOCUMENTS

| | | | |
|---|---|---|---|
| 8,104,248 | B2 | 1/2012 | Gillis et al. |
| 9,597,785 | B1 | 3/2017 | Gertner |

OTHER PUBLICATIONS http://starbornindustries.com/pro-plug-pvc-product, downloaded Sep. 29, 2023.
https://www.woodcraft.com/search?q=plug+cutters&button=search, downloaded Sep. 29, 2023.
https://www.strongtie.com/hiddendeckfasteners_screwsandnails/dcuscrewplugsystem_productgroup_fss/p/deck-drive-dcu-screw-plug-solution, downloaded Sep. 29, 2023.

* cited by examiner

BLADED PLUG CUTTING TOOL AND RELATED METHOD OF USE

BACKGROUND OF THE INVENTION

The present invention relates to the plugs for filling holes in a substrate, and more particularly to a plug cutting tool that forms a plug for insertion into a hole in a substrate such as a board.

Many outdoor structures are constructed with wood or composite materials. One such outdoor structure is an outdoor deck. A deck typically includes deck boards, constructed from wood, composites and/or polymers. These deck boards are secured to an underlying support structure, usually including multiple joists, which are oriented transverse to the deck boards. Many times, the deck boards are secured to the joists with fasteners, such as screws, that are installed through the upper surfaces of the deck boards, and can be advanced downward, into the underlying joists. When fully installed, these "face screws" extend through the deck boards and at least partially into the underlying joists, securing the deck boards to the joists.

When a face screw is installed in a deck board, many times, a head of the screw penetrates into the upper surface of the board. This occurs as the screw is being advanced into the board. As the head penetrates the board surface, it produces a hole in the upper surface of the board, which remains above the fastener. Depending on how far into the deck board the head is advanced, the hole can be ⅛ inch to ½ inch in extreme cases. As a result, an upwardly opening hole can be seen when a viewer looks down at the upper surface of the board. Where the board is wood, the hole can be a somewhat ragged or splintered hole. Where the board is composite or polymeric, the hole can be a neat almost cylindrical shape, depending on how the board material deformed or was displaced by the head engaging the board as the screw was advanced into the board. In either case, these resulting holes can be unsightly, and aesthetically displeasing. Further, these holes can trap and retain precipitation or other liquids, or dirt and debris that impinge the deck. Where water enters the holes, it can freeze and therefore expand in the holes in the winter in Northern climates, which can damage the deck board surrounding the holes. Further, water that remains in the holes over time can in some cases rust the screws therein, or promote algae or other growth in the holes.

Accordingly, deck builders frequently try to plug such screw holes in the upper surfaces of deck board to protect the boards and enhance the finished deck appearance. This plugging can be achieved with small plugs, which are pounded with a hammer into the holes from above the holes to plug those holes. Many different deck builders and decking manufacturers use a variety of different plugs. For example, some deck board manufacturers, particularly composite or polymeric board manufacturers, offer plug system packets that include anywhere from 100 to 1000 plugs. These plugs are usually color coordinated to the various colors of deck boards that the manufacturer offers. Accordingly, when the plugs are installed in the holes in a deck board, the plugs are intended to match the color of the board well.

This, however, is hard to achieve, and many times, the plugs from a particular packet system will not match the actual boards installed on a deck because the materials from which the boards and plugs are constructed, are from different batches of raw materials. In such cases, the plugs can appear as an obviously different shade or hue, contrasting the surrounding board. This can draw an observer's view to the plugs, and sometimes leave the observer with an undesired perception of the quality or aesthetics of the deck. Further, where the boards and the plugs have a faux wood grain or surface texture, it is frequently difficult to pull a plug from a packet and match its grain with the grain surrounding the hole in the deck board. This can be due to the plugs coming from a different batch of boards, or simply made with faux grain or texture that does not match the varying grain or texture of a stock deck board.

Accordingly, there remains room for improvement in the field of deck board plugs, and in particular, in the method of their production and tools for the same, as well as the ability to custom produce plugs to better match a particular deck board in a deck or other substrate.

SUMMARY OF THE INVENTION

A plug cutting tool is provided that produce plugs having an aesthetic exterior surface common to a donor board, the aesthetic exterior surface matching with a high degree of correspondence to another aesthetic surface of a recipient board into which the plug can be installed.

In one embodiment, the tool can include a tool axis; a first cutting edge that rotates about the tool axis and advances into a donor board face to produce a plug having a plug face including the aesthetic exterior surface, a plug sidewall and a plug bottom. The first cutting edge can be moveable toward a plug longitudinal axis to taper the plug below the plug face.

In another embodiment, the tool can include a carrier that rotates about the tool axis; and a blade joined with the carrier and including the first cutting edge. The first cutting edge can be moveable along a first extension axis transverse to the tool longitudinal axis as the blade rotates about the tool longitudinal axis. The first cutting edge can angle toward and move closer to the tool longitudinal axis as the first cutting edge bores a groove in a donor board to form the groove around the plug and simultaneously produces a plug sidewall inwardly tapered between the plug face and the plug bottom.

In still another embodiment, the tool can include the first cutting edge that can remove material from a plug sidewall so that the plug face has a greater dimension, e.g., a diameter, than another dimension near the plug bottom. This can inwardly taper the plug between the plug face toward the plug bottom. The taper can facilitate installation of the plug in a hole defined by a recipient board.

In yet another embodiment, the first extension axis can be offset from the tool longitudinal axis by a plug tapering angle that is 1° to 15°, inclusive; 1° to 10°, inclusive; 1° to 5°, inclusive, or other angles depending on the desired plug taper or other contouring on the plug sidewall.

In a further embodiment, the blade can include a second cutting edge opposite the first cutting edge and disposed farther from the tool axis than the first cutting edge. These edges can cooperatively bore a groove into the donor board surrounding the plug. The first cutting edge can cut material of the donor board to form the plug sidewall and the second cutting edge can cut material of the donor board to form a groove sidewall opposite the plug sidewall.

In still a further embodiment, the first cutting edge can transition to an adjacent first rake surface. This rake surface can extend outward from the cutting edge and can form a chip flowing surface along which cut chips flow when being removed from a donor board, and making a plug sidewall.

The rake surface can be disposed in at least one of a neutral rake angle and a negative rake angle.

In yet a further embodiment, the first cutting edge and the second cutting edge can share as a rake surface or chip flowing surface the first rake surface. The second cutting surface can be disposed radially outward from the first cutting surface.

In even a further embodiment, the plug can include a plug height. The first cutting edge can include a length that is less than the plug height. The first cutting edge can be configured to move toward the plug longitudinal axis to produce a taper in the plug sidewall between the upper portion and the lower portion of the plug.

In even a further embodiment, the carrier can define a first compartment. The blade can be reciprocally disposed in first compartment. The blade can be operable in a retracted mode in which the first cutting edge is proximal to the first compartment and disposed a first distance from the tool longitudinal axis, and an extended mode in which the first cutting edge is disposed distal from the compartment and disposed a second distance from the tool longitudinal axis. The first distance can be greater than the second distance.

In a further embodiment, the tool can include an actuator shaft. The actuator shaft can be reciprocally disposed in a second compartment defined by the carrier. The actuator shaft can include a bearing face that engages the blade to move the first cutting edge along the first extension axis, generally angled toward the longitudinal axis or inward to taper a plug sidewall under a plug face of the plug.

In still a further embodiment, the second cutting edge can be transverse to the first cutting edge. A second clearance surface can be adjacent the second cutting edge. The second cutting edge can remove material from an outer groove sidewall of the groove.

In yet a further embodiment, the tool can include a first clearance surface that flanks the first cutting edge and a first rake surface that flanks the first cutting edge opposite the first clearance surface. The first rake surface can be perpendicular to a first cutting plane. The first clearance surface can be disposed at a first clearance angle of 1° to 35°, inclusive, relative to the first cutting plane.

In even a further embodiment, the tool can include a first clearance surface adjacent the first cutting edge. The clearance surface can include a clearance angle of 3 degrees to 15 degrees, inclusive. This clearance surface can facilitate removal of chips of the substrate, and can allow the first cutting edge to move along a cut surface, and reduce friction as the tool rotates.

In another embodiment, the tool can include a stabilizer in the form of a sleeve and/or handle that extends around the carrier. The stabilizer can engage a donor board face, and can be grasped by a user manually while the carrier and blade rotate within the sleeve to start forming a plug. This can impair the tool from walking or wobbling relative to the donor board as the plug is started or formed.

In still another embodiment, the carrier and blade can rotate within the sleeve, and can further extend relative to the sleeve during a plug forming operation. After the plug is cut, the blade can retract relative to the sleeve, or the sleeve can extend relative to the blade, to conceal or protect the cutting edges.

In yet another embodiment, the tool can include a stabilizer in the form of a positioning block that can be secured to a donor board. The block can define one or more bores into which the carrier can be placed. The tool can be rotated within a selected bore, which can impair the tool from walking or wobbling relative to the donor board as the plug is started or formed. The tool can be moved from one bore to another, forming multiple bores in the donor board as the tool is moved from one to another. The block can be removed and the resulting formed plugs can be picked from the board and used in further applications.

In a further embodiment, a method is provided. The method can include boring a groove in a donor board face with a rotating tool to form a plug centered in the groove, the plug retaining an aesthetic exterior surface of the donor board face, the plug including a plug sidewall and a plug lower portion located below a plug upper portion; and moving a cutting edge so that the plug face includes a first diameter greater than a second diameter of the plug lower portion. The plug face can retain the aesthetic exterior surface above plug sidewall.

In yet a further embodiment, the aesthetic exterior surface can include a grain, for example a natural or synthetic wood grain. The aesthetic exterior surface can include a color, hue or other aesthetic feature. The plug can further include a plug grain axis, along which a grain is oriented and/or parallel thereto.

In even a further embodiment, the method can include inserting the plug in a recipient board having a similar or identical aesthetic exterior surface, for example, a grain, hue, color or texture. The method can include rotating the plug to align the plug grain axis on the plug face with a recipient board axis of the recipient board.

In another embodiment, the method can include moving a cutting edge inward toward a plug longitudinal axis under the plug face to make the plug sidewall tapered below the plug face, wherein the cutting edge removes a material from the plug sidewall to make the plug sidewall tapered below the plug face.

In still another embodiment, the method can include rotating a tool, including a first cutting edge about a tool longitudinal axis; engaging the first cutting edge against a donor board to penetrate a donor board face of the donor board, the donor board face including an aesthetic exterior surface; boring a groove below the donor board face with the first cutting edge, the plug retaining the aesthetic exterior surface along a plug face in a plug upper portion, the plug including a plug sidewall facing the groove, and a plug lower portion located below the plug upper portion; and advancing the first cutting edge along a first extension axis that is transverse to the tool longitudinal axis, while rotating the tool, to taper the plug so that the plug is inwardly tapered between the plug upper portion and the plug lower portion. As a result, the plug face can include a first dimension greater than a second dimension of the plug lower portion.

In yet another embodiment, the method can include moving an actuator shaft within a carrier, the actuator shaft including a bearing face, so that the bearing face engages the blade to move the first cutting edge along the first extension axis.

In even another embodiment, the method can include moving the first cutting edge toward the tool longitudinal axis below a carrier and below the plug face as the first cutting edge advances farther into the donor board below the plug face, wherein the first extension axis is offset from the tool longitudinal axis by a plug tapering angle that is optionally 1° to 45°, inclusive; 1° to 35°, inclusive; 5° to 30°, inclusive; 5° to 20°, inclusive; 1° to 30°, inclusive; or 5° to 15°, inclusive.

In a further embodiment, the method can include installing multiple boards to form a deck and installing fasteners to secure the boards to underlying joists such that fastener holes are formed as the fasteners are installed. The boards can include a grain adjacent each of the respective fastener holes. A piece of scrap board from a same batch of boards that form the deck can be provided. The tool can produce one or more plugs from the scrap board, so that the grain, color hue or other aesthetic feature of the scrap generally matches a recipient board. A user can install the plugs in respective fastener holes, such that the plugs from the scrap match the boards defining the fastener holes in grain, color, hue and/or texture or other aesthetic exterior surface or grain as defined herein.

In still a further embodiment, the method can include identifying a first grain adjacent a fastener hole of a recipient board; identifying a similar or identical grain from a donor board, for example a scrap board, from the same batch of boards as the recipient board or that form a deck; producing a plug having a plug sidewall with the second grain; and installing the plug in the fastener hole so that the first grain of the recipient board aligns with the second grain, so that the plug is virtually unnoticeable from a viewer of the recipient board and/or the deck.

In yet a further embodiment, the method can include rotating at least one cutting edge about a tool longitudinal axis; and moving a blade along a first extension axis transversely relative to the longitudinal axis of the plug so that the cutting edge tapers the plug sidewall. When this occurs, the cutting edge can taper the plug sidewall so that the plug includes a greater diameter adjacent the plug face than adjacent a plug bottom. This also or alternatively can form the plug so that the plug sidewall optionally can angle inward from a vertical line that intersects the edge of the plug face at an acute angle, for example, optionally 1° to 45°, inclusive; 1° to 35°, inclusive; 5° to 30°, inclusive; 5° to 20°, inclusive; 1° to 30°, inclusive; or 5° to 15°, inclusive, or other angles depending on the blade and cutting edge. The plug bottom can include a smaller diameter, and can be inserted or installed relative to a fastener hole with greater ease.

The current embodiments provide a tool and related method can efficiently and quickly produce a plug for installation in a fastener hole defined by a substrate, for example a deck board or other workpiece. Where the tool is used on a job with boards or substrates constructed to include a generally uniform grain, color, hue or other aesthetic exterior surface, the tool can be used to cut aesthetically matching plugs from scrap to install in fastener holes defined by the boards. This can minimize wasted scrap, and/or otherwise repurpose the scrap for manufacture of plugs on a jobsite. Where the boards and scrap are from the same manufacturing batch from a supplier, the likelihood of closely and/or perfectly matching the plugs with the boards can be maximized. As a result, a finished deck constructed with the plugs can more pleasingly and thoroughly match the deck boards surrounding the fastener holes into which the plugs are installed. Where the tool is tilted to produce a tapered plug, the tapered plug can install within a fastener hole, particularly a round or cylindrical one with a diameter greater than the tapered end of the plug, more easily and efficiently.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments or are being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
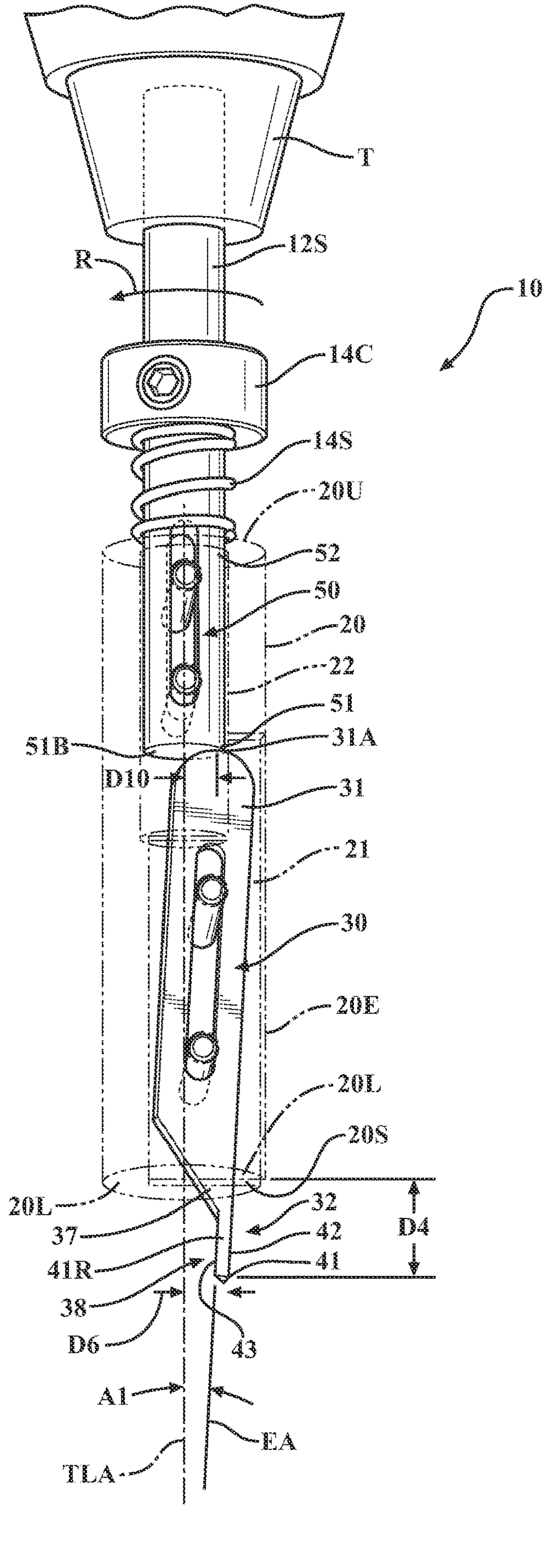
FIG. 1 is a perspective view of the plug cutting tool of a current embodiment in a retracted mode.

A current embodiment of the plug cutting tool is shown in FIGS. 1-12 and generally designated 10. The tool 10 as mentioned above can be configured to produce one or more plugs 100 from a donor board or other substrate DB as shown in FIGS. 6-12. As generally shown there, the tool 10 can include a tool longitudinal axis TLA about which a carrier 20 rotates or spins (as shown, in an optional clockwise manner) and a blade 30 extendably disposed in the carrier 20, such that the blade can optionally spin and move with the carrier when rotated in direction R by a tool T, which can be a rotational power tool, such as a drill or other rotating device. The tool T can rotate the tool 10 about a tool longitudinal axis TLA in a direction R. The tool can include an actuator shaft 50 joined with a tool shaft 12S that connects to the tool T. The actuator shaft 50 can engage the blade 30 when operated by a user to extend the blade along a first extension axis EA, generally toward the tool axis TLA as the carrier and blade rotate. The extension axis EA can be angularly offset at a plug tapering angle A1 from the tool axis TLA to produce a taper on the plug 100 under the plug face 100 PF as described below. The extending blade also can produce a donor board groove also referred to as a plug perimeter groove or groove DBG surrounding or otherwise extending at least partially around the plug 100 that can be disassociated or dislodged from the donor board and placed in recipient board RB to plug a hole 100H2 defined by the recipient board, optionally over a fastener 105.

Figure 8:
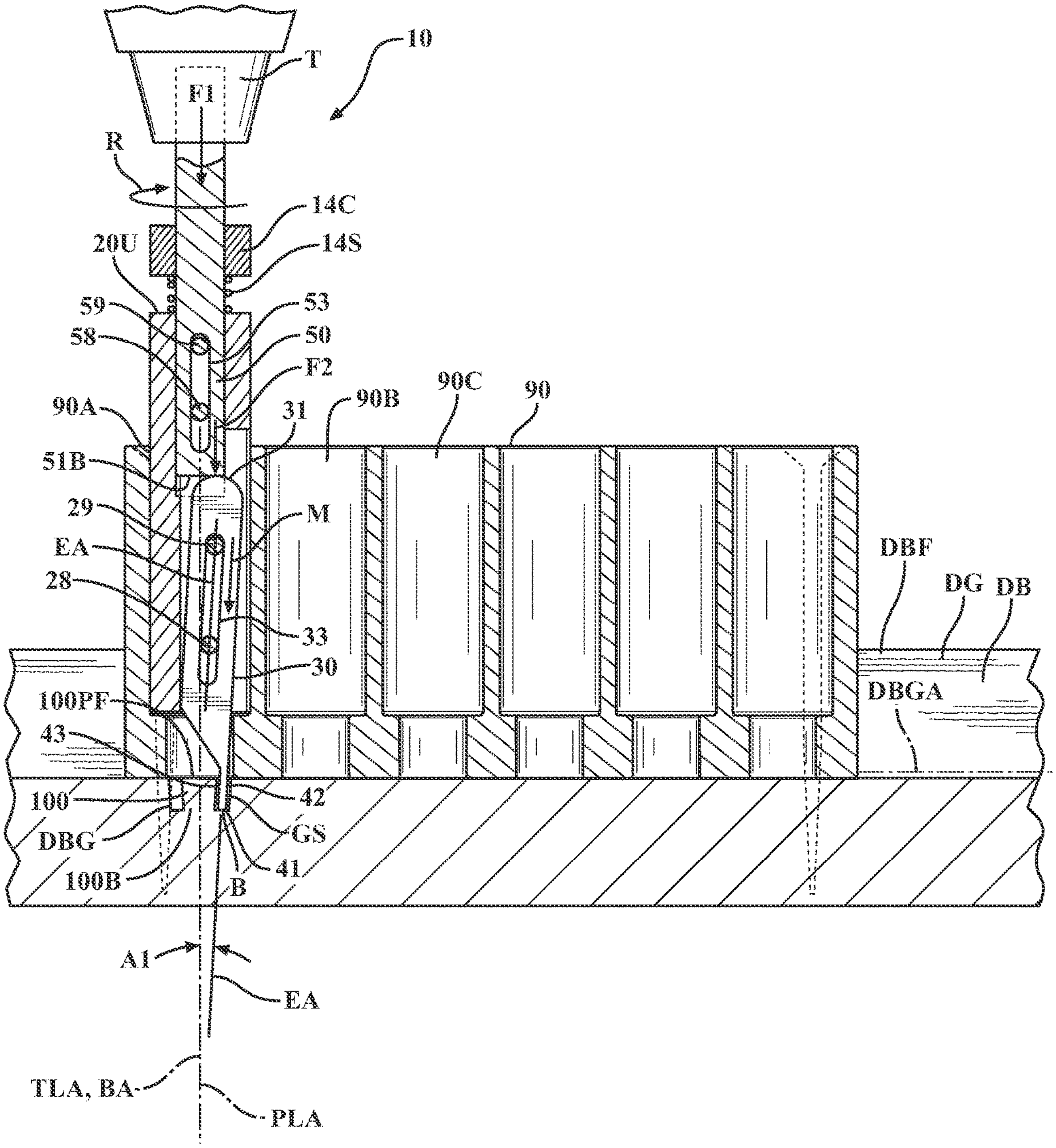
FIG. 8 is a side partial section view of the tool with the stabilizer in place, with the blade including the first and second cutting edges in an extended mode producing an outer groove sidewall and a plug generally having a tapered plug sidewall from the donor board.
Figure 9:
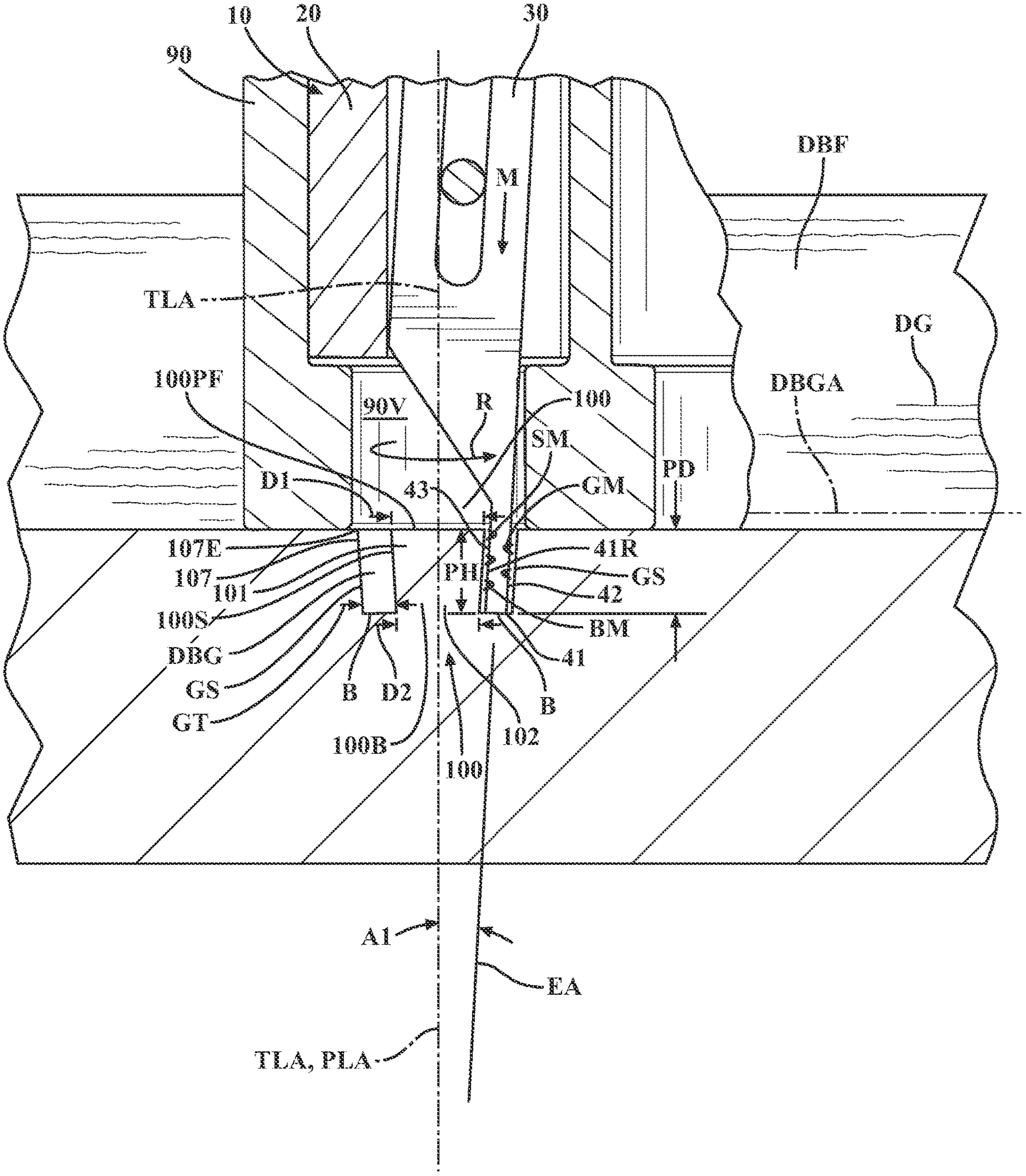
FIG. 9 is a close-up view of the tool in the extended mode with the first cutting edge boring the groove and forming the plug sidewall that is tapered, with the second cutting edge producing the outer groove sidewall.
Figure 10:
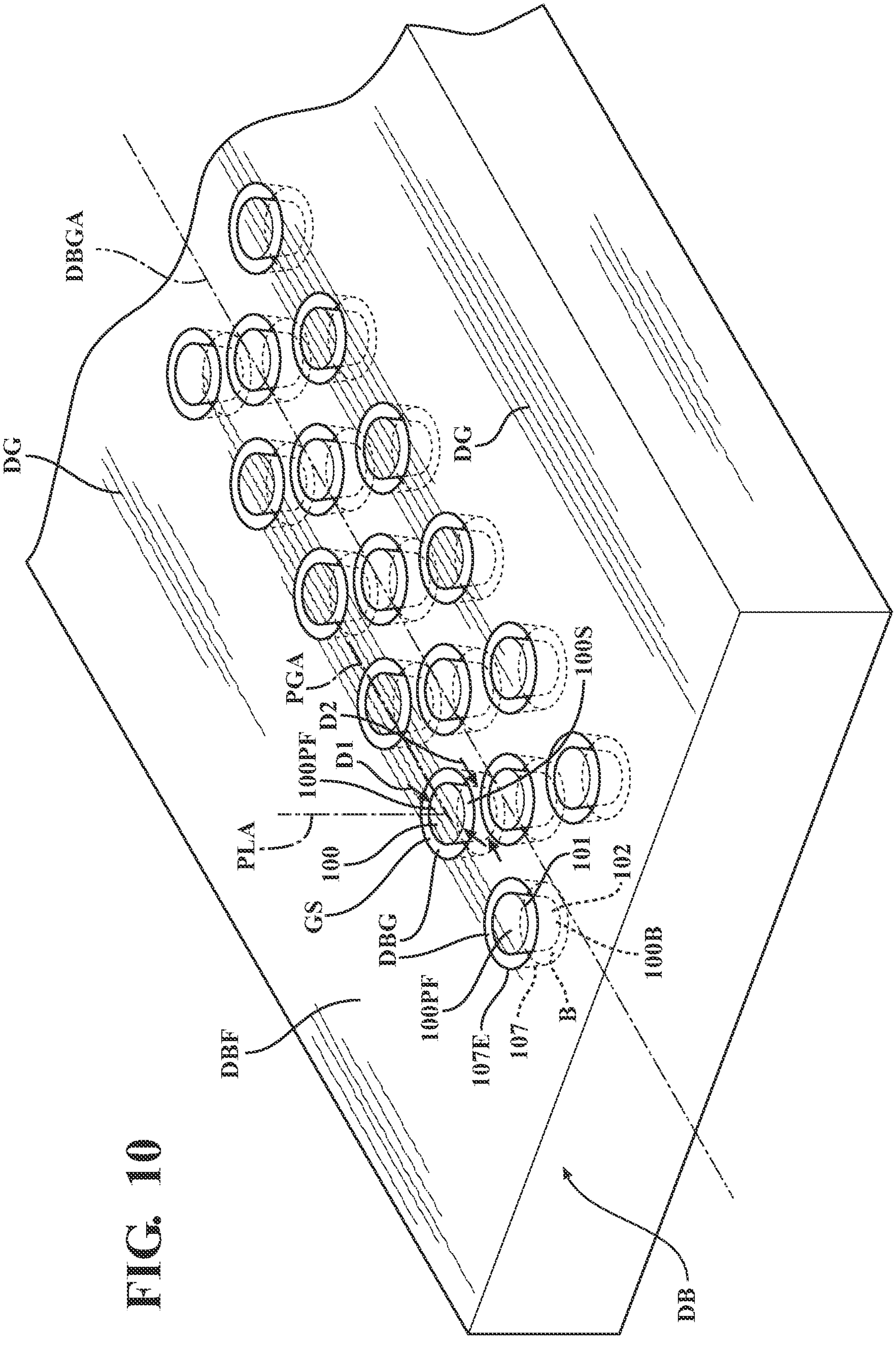
FIG. 10 is perspective view of plugs produced by the tool of the current embodiment in a donor board, such as a piece of scrap, the plugs including plug grains corresponding to the donor board grain.
Figure 11:
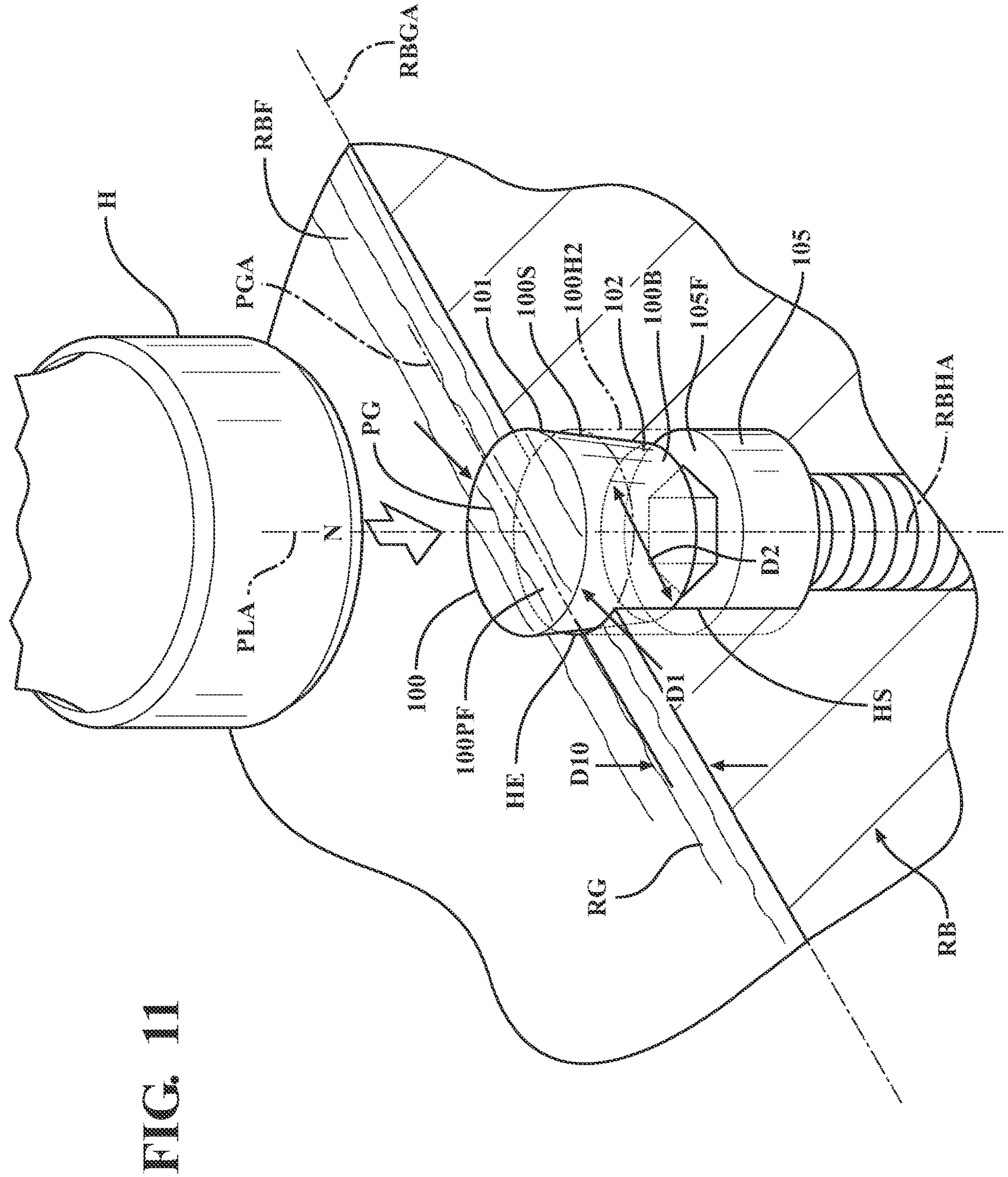
FIG. 11 is a perspective view of a produced plug initially installed in a hole of a recipient board, and forced farther into the hole with another tool.
Figure 12:
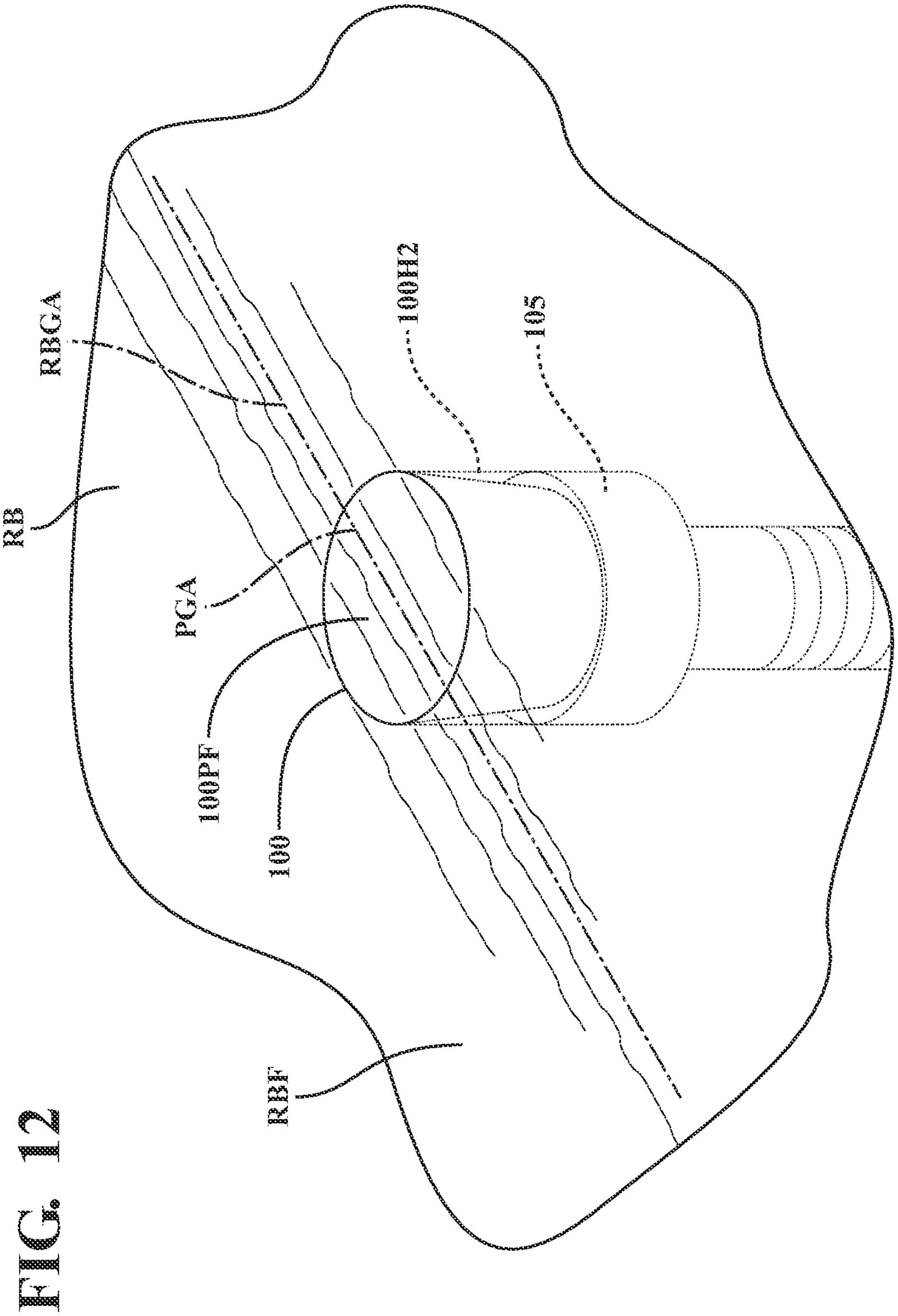
FIG. 12 is a perspective view of the plug, produced with the tool, fully installed in the recipient board.

The tool 10 can include one or more cutting edges 41, 42, 43 included or joined with the distal end 32 of the blade 30 to produce the plug 100. Those cutting edges can have a variety of different functions. Those cutting edges can be activated to engage difference parts of the groove, the donor board or the plug itself depending on different orientations of the tool relative to the donor board DB. For example, the tool can be oriented as shown in FIGS. 8-10 so that the first cutting edge 41 and second cutting edge 42 can engage the donor board DB and produce the donor board groove DBG with its groove bottom B via the first cutting edge 41, and produce the outer or exterior groove side wall GS with the second cutting edge 42. The third cutting edge 43 can be configured to engage the plug side wall 100S as shown in FIGS. 8-9 when the blade is advanced in direction M along the extension axis EA toward the tool longitudinal axis TLA. As this occurs, and the third cutting edge 43 moves inward in direction K under the plug face 100PF toward the tool axis TLA, which in turn allows the third cutting edge 43 to remove material from the plug sidewall 100S while the blade 30 and tool 10 in general rotate. This can thereby taper the plug between the plug face 100PF and the plug bottom 100B so that the diameter or other dimension of the plug D1 at the plug face 100PF is greater than the diameter D2 of the plug at or near the plug bottom, or somewhere in the lower portion 102 of the plug below the upper portion 101 of the plug. With this taper, the plug can be easily installed in a hole 100H2 of a recipient board RB with the smaller lower portion fitting into the hole and enabling the remainder of the plug including the upper portion to be pounded or forced into the hole to wedge and/or compress or fit the plug securely in the hole as shown in FIGS. 11-12.

While suited for a variety of applications, the plug cutting tool can be used to produce a variety of plugs, for example tapered plugs that retain an aesthetic exterior surface or face or grain as defined herein on a plug face 100PF of the plug 100. The plugs produced by the tool 10 can be removed from a donor board DB after being produced as shown in FIG. 10 using any type of tools, such as a picker, a screwdriver or a particular plug tool and methods as disclosed in co-pending U.S. application Ser. No. 18/200,779, filed on May 23, 2023, entitled Plug Tool and Related Method of Use, which is hereby incorporated by reference in its entirety. Such tools can be used to disassociate, dislodge, break off or remove the plug bottom 100B from the donor board and the material adjacent the groove bottom B.

After being produced via the tool 10 of the current embodiment, the exemplary plug 100 shown in FIGS. 9-10 can be connected or joined with a donor board DB. The plug can include a plug longitudinal axis PLA which extends orthogonally from a plug face 100PF of the plug 100. The donor board DB can include a plug perimeter groove DBG around the plug 100. The plug 100 can include a plug face or outer exterior surface 100PF which is generally visible when the plug is joined with the donor board DB or installed relative to a hole defined by a recipient board RB as described below.

Figure 7:
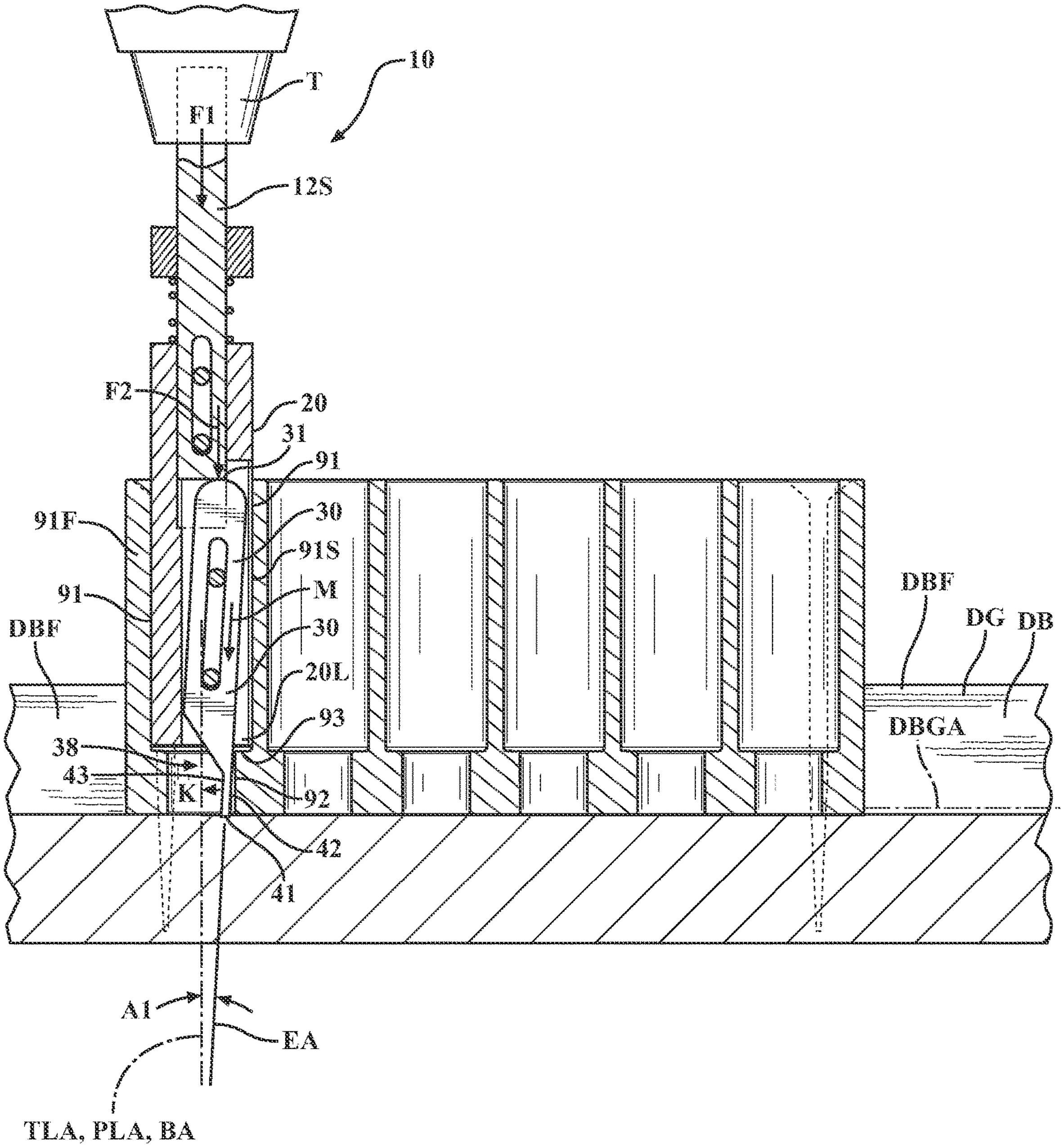
FIG. 7 is a side partial section view of the tool with the stabilizer in place, with the blade including the first and second cutting edges in a retracted mode and initially engaging a donor board face.

The tool 10 can be operated as shown in FIGS. 7-9 so as to taper, step, reduce in diameter or dimensions (all referred to as taper herein) of portions of the plug below the plug face 100PF, optionally while retaining most or all of the initial dimension D1 of the plug face. In so doing, the blade 30 and the respective cutting edges 41, 42, 43 can be advanced along an extension axis EA that is offset at a plug tapering angle A1 from the tool longitudinal axis TLA as well as a plug longitudinal axis PLA, which as shown in FIGS. 9-10, is the original plug longitudinal axis PLA before the plug is broken or disassociated from the donor board DB. The plug tapering angle A1 can be at least 1°, at least 2°, at least 3°, at least 4°, at least 5°, at least 10°, at least 20°, at least 30°, about 1° to about 35°, inclusive; about 1° to about 30°, inclusive; about 1° to about 15°, inclusive; about 1° to about 10°, inclusive; about 1° to about 5°, inclusive; about 1° to about 3°, inclusive; about 1°, about 2°, about 3°, about 4°, about 5°, or other angles.

With reference to FIGS. 10-12, after the plug 100 is produced with the tool, and then disassociated from the donor board DB by any suitable tool or means, a user can align the plug longitudinal axis PLA with the recipient board hole axis RBHA that extends from the recipient board plug hole 100H2. The user can install the plug in the hole 100H2. The user can align the plug grain PG or plug grain axis PGA with the recipient board grain axis RBGA by moving or rotating the plug 100 about the plug longitudinal axis PLA. In so doing, the plug grain axis PGA of the plug grain PG on the plug face 100PF can also be well aligned with the recipient board grain axis RBGA so that the plug 100 melds and is visually indistinguishable from and further aligned with the remainder of the recipient board face RBF and the grains RG on that board.

Upon such alignment, the plug 100 can be further installed if suitable in the hole 100H2 of the recipient board RB, optionally being pounded or forced, optionally with a tool H, into that hole 100H2 so that the plug effectively plugs that fastener hole, above the optional fastener 105 such that there appears to be continuity and/or a smooth and perhaps unnoticeable aesthetic transition between the plug and the workpiece. This process can be repeated for multiple fasteners 105 and fastener holes in multiple workpieces or boards.

The environment, boards and plugs with which the plug tool of the current embodiment optionally can be used will now be described in more detail. Turning to FIGS. 10-12, the current embodiment of the tool can be used in connection with the construction of a deck having one or more recipient boards that are secured with fasteners 105 to one or more underlying support structures, which optionally can be in the form of joists, beams or member; however, the embodiments herein are well suited for a variety of other types of substrates and plugs to produce plugs from those substrates. As used herein, a board or substrate, such as a donor board DB or recipient board RB, can refer to any work piece constructed from any type of material, such as wood, polymers, composites, metal, synthetic materials or the like. The substrate or board can include a thickness, an outer aesthetic surface and/or a texture, where one or more plugs can be extracted from the same using the tools and methods described herein.

As shown in FIGS. 10-15, a board, such as a donor board DB or recipient board RB can each include a particular grain DG or RG, respectively as shown. These grains, and any grain referred to or described herein, can be or can mimic a natural or synthetic wood grain and/or can be in the form of a texture, design, image, color gradient or transition, printed pattern, structural pattern, surface treatment, contour, ridges, projections, recesses, undulations or other surface or cosmetic features whether two dimensional or three dimensional. Optionally, the grains can be associated or aligned with each board along an axis, such as the donor board grain axis DBGA or the recipient board grain axis RBGA. These axes optionally can correspond to the direction in which a portion and/or a majority of the grains of the respective boards extend along the length or other dimension of the boards.

Optionally, the donor board DB can be in the form of a piece of scrap cut, removed or disassociated from one or more of the other boards in the deck being constructed from recipient boards. Thus, the plug 100 can be removed from that scrap donor board DB, which can be from the same batch, materials and aesthetics as the recipient boards or other structures. In some cases, the donor board can be removed from a recipient board and form scrap. Where the boards are deck boards, those deck boards can form a deck. Accordingly, where the plugs are removed from the donor boards, which can be highly similar to the recipient boards or formerly forming parts of one or more recipient boards in a deck or other structure, there can be a high probability that the plugs 100 can include a plug face 100PF having a grain as described herein, and/or color, hue or other aesthetics, that can precisely and/or closely match the recipient board grain RG, color, hue, or other aesthetics of the recipient boards RBs in which the plugs are installed. Accordingly, plugs produced from the scrap can match well the surfaces of the recipient boards. This good, near and/or exact match can offer a clean and aesthetically pleasing, uninterrupted surface for each of the respective boards and thus the deck or other structure built with the boards and plugs using the plug tool and methods of the current embodiment.

The plugs 100 as described herein can include a plug face 100PF as shown in FIGS. 10-12. The plug face can include a plug face grain PG, which optionally can be aligned along a plug grain axis PGA. The plug face can include a plug longitudinal axis PLA that runs through or intersects the plug face 100PF, optionally being perpendicular and/or orthogonal to the plug face. The plug can also or alternatively include a color, hue or other aesthetic, which can be configured to match or have some other relationship with the donor board and/or the recipient board. The plug can include an upper portion 101 and a lower portion 102. The upper portion can include the plug face 100PF. The lower portion 102 can include a plug bottom 100B. The upper portion and plug face optionally can be round or circular as shown, or can be of other shapes depending on the application.

The plug can include a plug sidewall 100S extending from the upper portion to the lower portion. This sidewall can be tapered as shown, such that the diameter or dimension D1 of the plug at the plug face is greater than the diameter dimension D2 of the plug at the plug bottom. The plug can be of a partially frustoconical shape, with a generally flat or planar plug face, optionally including a grain or texture as described herein, and a bottom 100B that can be somewhat planar, or can have some irregularities, bumps, and/or jagged parts or projections due to the bottom of the plug 102 having been separated from the donor board. The plug can optionally be of a greater dimension at the plug face, including the texture or grains that are a continuation of the donor board grains, than at the bottom of the plug. Of course, in other cases, the plug sidewall can be cylindrical, stepped, concave, convex or other contours depending on the application. Further, the plug can include one or more steps, shoulders, different dimensions or shapes as the plug extends from the plug bottom to the plug face. The plug sidewall can be smooth, roughed, textured, contoured and/or can include recesses or projections formed via the tool 10 as described herein.

In the embodiment shown, the plug 100 can be produced from a donor board DB. The plug face 100PF can be continuous with the exterior board surface or board face of the donor board DB. The plug face can include the plug grain PG which can be part of or separated from the recipient board face. The plug grain can be formerly a part of the donor board grain DG. The plug grain PG can lay along or be aligned with a plug grain axis PGA. This plug grain axis can be aligned or parallel with the recipient board grain axis RBGA, with the plug grain PG and donor board grain DG once having been connected, contiguous or otherwise associated with one another.

Figure 13:
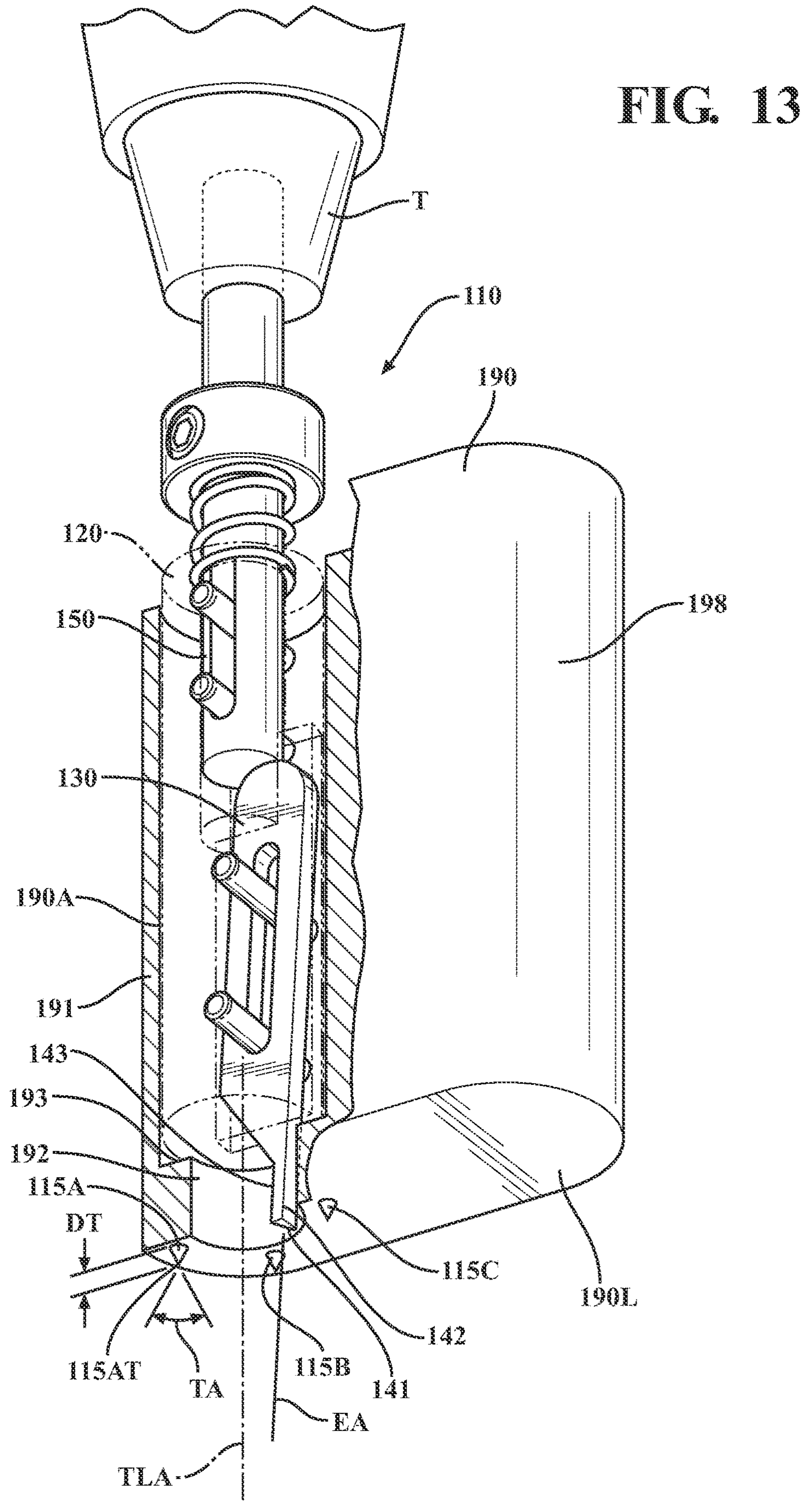
FIG. 13 is a lower perspective partial section view of an alternative embodiment of the plug cutting tool in a retracted mode, with a stabilizer in the form of a manually graspable handle.

A shown in FIGS. 10-12, the plug can be formed from the donor board DB using the tool. The plug 100 can be surrounded by a donor board groove DBG before removal. This donor board can include a bottom B that is initially joined with the plug bottom 100B until removal using the plug tool. The donor board groove can circumscribe the plug 100 while the plug is still attached to the donor board. The donor board groove DBG can include a donor board groove sidewall GS that is separate and distal from the plug sidewall 100S. The donor board groove sidewall GS optionally can be cylindrical, while the plug sidewall 100S can be tapered or noncylindrical. The plug face can be separated a distance D3 from the donor board face DF by the groove DBG as shown in FIG. 13. Optionally, this distance D3 can be at least 0.05 inches, at least 0.10 inches, at least 0.15 inches, at least 0.20 inches, between 0.05 and 0.25 inches, inclusive; between 0.10 and 0.20 inches, or other distances depending on the size of the plug and the plug groove or donor board groove. The outer perimeter of the plug face 100PF can be round or circular, as can be the perimeter of the groove where the donor board face DF ends around the groove. At this location, the donor board groove DBG can include an upper perimeter 107 and upper perimeter edge 107E.

Returning to FIGS. 9-11, the plug 100 and plug bottom 100B also can be integrally formed with, and or can form a part of, the donor board DB until the plug is separated from the donor board DB using a tool. For example, the plug can extend upward from the bottom B of the groove DBG. The plug can be constructed from the same material as the bottom of the groove, and can be integrally and homogeneously formed with the portion of the donor board DB under the plug. For example, where the donor board and plug are formed from a composite or plastic, the composite or plastic material can extend upward contiguously and continuously from the material underlying the plug and into the plug itself. The plug of course can be surrounded by the plug sidewall 100S, which can transition to the groove bottom B at the lower portion of the plug, and can transition to the plug face 100PF at the upper portion of the plug 100. The plug sidewall, as noted above, however, might not include the grains or other contours of the plug face, due to that feature being formed from the cutting edges of a plug cutting tool.

The structure, components and features of the plug cutting tool 10 of the current embodiment will now be described in more detail with reference to FIGS. 1-5. The tool 10 can define a tool longitudinal axis TLA which can be common to the various features of the tool. The tool and its features can rotate about the tool longitudinal axis TLA when the tool 10 is rotated, optionally via a rotating tool T, such as a drill. The tool 10 can include a carrier or housing 20.

The carrier 20 can include one or more compartments 21 and 22 to house, hold and/or guide various other components of the tool as described below. The carrier 20 can be joined with a shaft 12S that attaches to the tool T. The shaft 12S can include a collar 14C attached to it. The collar 14C can be fixedly and non-rotationally secured to the shaft 12S. Between the collar 14C and upper surface 20U of the carrier 20, a biasing member 14S can be disposed. This biasing member can be in the form of a coil spring or other type of spring, such as a leaf spring, an elastomeric element or a system of repelling magnets. The spring 14S can bias the carrier 20 so the blade 30 is in a generally retracted, or non-extended mode shown in FIG. 1 in which the blade and cutting edges extend a minimal distance D4 beyond the lower surface 20L of the carrier 20. In this manner, the various cutting edges 41, 42, 43 as described below are not readied or positioned to perform any cutting action or removal of material from the donor board, or to otherwise to form a plug. Of course, the spring 12S can be absent from the tool in some applications, and the carrier can be moved via the user or some other mechanism.

Figure 2:
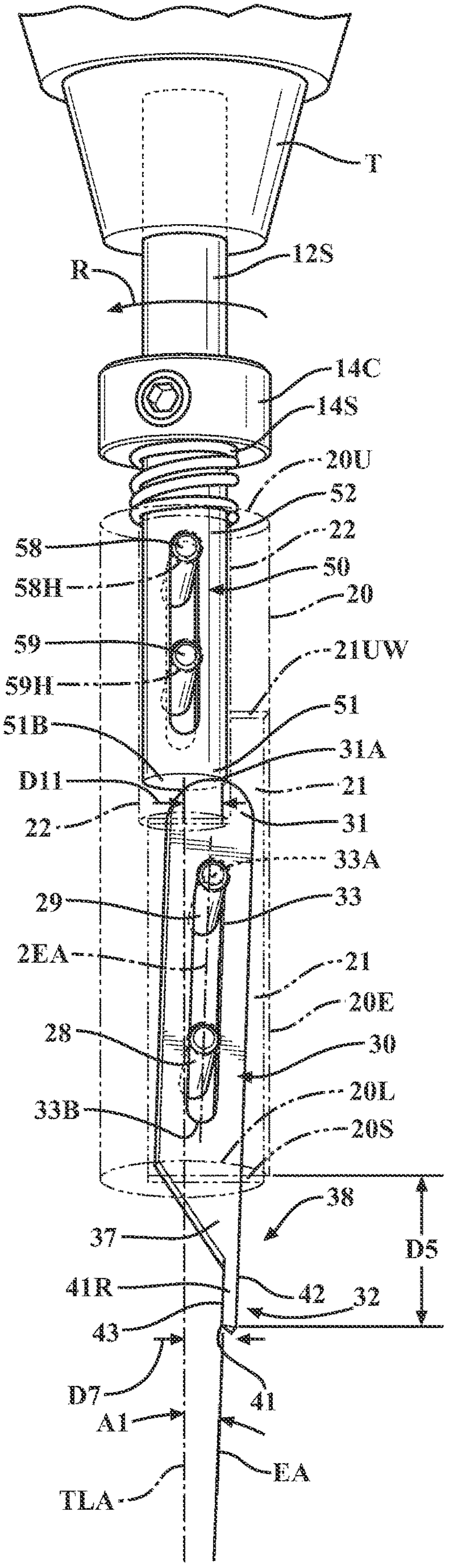
FIG. 2 is a perspective view of the plug cutting tool in an extended mode.

The blade and cutting edges can be transitioned to an extended or further extended mode as shown in FIG. 2, in which the blade and cutting edges extend a greater distance D5 from the lower surface 20L of the carrier 20. Generally, in the extended mode, the blade 30 and its respective cutting edges 41, 42, 43 can progressively project from the carrier farther and farther beyond the lower surface 20L until achieving a plug depth PD, which can correspond to a plug height PH of a plug 100 produced with the tool as described further below.

The carrier 20 as mentioned above can include various compartments, recesses, slots, holes and the like, all referred to herein as compartments. Referring to FIGS. 1 and 2, the carrier can include a first compartment 21 defined by a lower end 20L of the carrier 20. The first compartment 21 can be in the form of a slot that extends inwardly from an exterior surface 20E of the carrier 20. As shown, this exterior surface 20E can be a cylindrical surface, however in other applications as described in the alternative embodiment below, the surface can vary, and can be rounded, polygonal, contoured or other shapes and sizes. The first compartment 21 can be sized to receive the blade 30 which can extend and can be movable within that compartment 21. The compartment 21 optionally can extend outward to an outward facing slot 21O and to a lower slot 20S. The outward slot 21O can be defined by the exterior surface 20E above the lower surface and can extend upward optionally parallel to the tool axis TLA. The lower or bottom slot 20S can be defined by the lower surface 20L of the carrier 20, and can transition to the outward slot 21O. The compartment 21 can extend upwardly within the carrier from the lower surface 20L toward the upper surface 20U of the carrier. In some cases, the slot can extend all the way from the lower surface to the upper surface. In other cases, the slot can extend only a portion of that distance between the upper surface and the lower surface.

Figure 3:
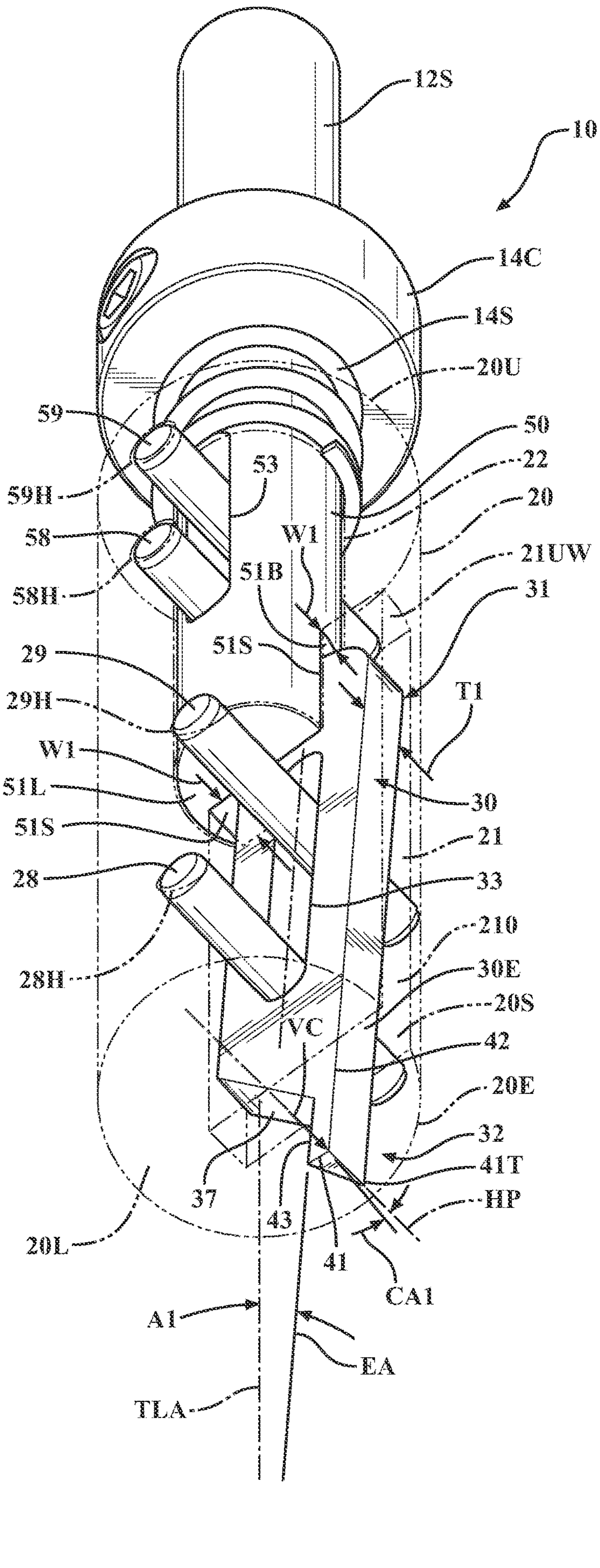
FIG. 3 is a close-up perspective view of a cutting edge end of the tool in the extended mode.

As shown in FIG. 3, the first compartment 21 can be sized to receive the blade 30 therein. The blade can be movably, extendibly and/or slidably disposed in the first compartment 21. Generally, the blade can be journaled in that first compartment or carrier slot extending downward toward the carrier lower surface 20L, alongside and/or intersecting the tool longitudinal axis TLA. The carrier 20 can include one or more pins 28 and 29 that extend through the carrier in a direction offset from the tool longitudinal axis TLA. These pins 28 and 29 can intersect and/or pass through the first compartment 21, optionally from a first side of the compartment to a second side of the compartment. As shown, these pins can be in the form of dowels, bars, fasteners or other elongated elements. Optionally, although not shown, the pins can be in the form of simple projections that engage respective recesses in the blade 30 to guide the blade. Further optionally, although not shown, the pins can be joined with the blade 30 itself and optionally can be bosses that engage corresponding recesses defined in the compartment 21.

The pins 28 and 29 as shown can be within and protrude though respective holes 28H and 29H. The holes may or may not be threaded to receive the pins, which may or may not be fasteners. In other cases, the pins can be secured in the respective holes via friction fit or via use of cement, adhesives, welds or other fastening techniques. The pins optionally can be sized so that they do not extend beyond the exterior 20E of the carrier 20. Optionally, the pins 28 and 29 can be spaced so that the upper pin 29 is farther from the tool longitudinal axis TLA than the lower pin 28. This can assist in guiding the blade and the respective cutting edges 41, 42, 43 along the first extension axis EA that is transverse to the tool longitudinal axis TLA and offset relative to that tool longitudinal axis by the plug tapering angle A1 as described below.

The carrier 20 optionally can include a second compartment 22 that can be disposed above the first compartment 21 and optionally can intersect or overlap a portion of the first compartment 21. As shown in FIGS. 1-3, the second compartment 22 can extend from an upper surface 20U of the carrier 20 downward and optionally beyond and upper portion or upper wall 21UW of the first compartment 21. This second compartment 22 can be shaped and sized to slidably, movably and/or retractably receive an actuator shaft or actuator bar 50 therein. The actuator shaft 50 can be joined with the tool shaft 12S that joins with the tool T used to rotate the carrier and/or blade with cutting edges. In some cases, the actuator shaft 50 can be integrally formed with and can be an extension of the tool shaft 12S. The second compartment 22 can have a cylindrical shape, but of course other shapes, such as polygonal shapes can be substituted for this construction and shape. As shown, the actuator shaft 50 can be of a similar cylindrical shape so that the shaft 50 can slide and or move easily within the second compartment 22.

The actuator shaft 50 optionally can be trapped or secured to the carrier but movable within the second compartment 22. For example, as shown in FIGS. 2 and 3, the actuator shaft 50 can be secured in the carrier and within the second compartment 22 via pins 58 and 59. These pins 58 and 59 can be disposed along and can intersect the tool longitudinal axis TLA. These pins also can be parallel with one another and perpendicular to the tool axis. These pins can be disposed through respective pin holes 58H and 59H defined by the sidewalls of the carrier that surround the second compartment 22. The pins and the attachment thereof to the carrier can be similar or identical to the other pins 28 and 29 described herein, however the pins 58 and 59 might not be disposed at different distances from the tool longitudinal axis like those other pins 28 and 29. Of course in some applications, they could be so disposed.

With further reference to FIGS. 2 and 3, the second compartment 22 can intersect and/or overlap with the first compartment 21. This is so that the blade can adequately move when being actuated by the actuator shaft 50, and can retract and/or extend relative to the carrier in the first compartment 21. Optionally, however, these compartments 21 and 22 do not overlap.

The carrier can be constructed from a variety of materials. For example, it can be constructed from a metal, such as aluminum or steel which can be generally rigid and sturdy. In other applications, the carrier can be constructed from a polymer. The carrier also can be constructed from other materials, such as composites. In yet other applications, the carrier can be absent from the tool, and the cutting edge and actuator bar can be linked or oriented relative to one another via other mechanisms.

As mentioned above, the actuator shaft 50 can be journaled and/or received at least partially in the carrier 20 and in particular the second compartment 22. The actuator shaft 50 optionally can include an upper end 52 and a lower end 51 as shown in FIGS. 2 and 3. The upper end 52 can be joined with or form an extension of the shaft 12S. The lower end 51 can include a bearing face 51B. This bearing face optionally can be disposed within a slot 51S defined by the actuator shaft 50. The slot 51S can extend to the lower surface 51L of the actuator shaft 50. The slot 51S can be of a width W1 that is greater than or equal to the thickness T1 of the blade 30 as described below. This is so the upper portion 31 of the blade 30 can move, slide, retract and/or extend relative to that slot as the blade 130 moves along the extension axis EA. The bearing surface 51B can be configured in a flat or planar configuration. In other applications, it might be slightly rounded.

Optionally, the bearing surface 51B interfaces with and uppermost end 31 of the blade 30. This uppermost end 31 can be in the form of a rounded, semi-circular or contoured structure. The rounded upper end 31 of the blade can move, slide and/or otherwise move along the bearing surface 51B as the actuator bar 50 engages the end 31 to push the blade 30 downward so that the cutting edges 41, 42, 43 extend the distance D5 from the lower surface 20L of carrier. As shown in FIG. 2, the upper end 31 of the blade 30 can include an upper apex 31A which optionally can be a portion of a rounded edge. This upper apex 31A can be configured to directly engage the bearing surface 51B of the actuator shaft 50. The bearing surface further can be configured so that as the blade moves along the extension axis EA and the actuator shaft 50 moves along the tool longitudinal axis TLA, the apex 31A moves closer to the tool longitudinal axis TLA. For example, as shown in FIGS. 1 and 2, the apex 31A can begin at a distance D10 from the tool longitudinal axis TLA which can correspond to the center of the actuator 50. As the blade 30 moves along the extension axis EA, it moves closer to the tool longitudinal axis TLA due to the plug tapering angle A1 angling the blade and cutting edges inwardly, toward the axis TLA and/or away from the exterior 20E of the carrier. Thus, when the cutting edges 41, 42 and 43 reach the extended mode shown in FIG. 2, the apex 31A is at a lesser distance D11 from the tool longitudinal axis TLA and generally closer to the center of the actuator 50. Due to the round, contoured or in some cases planar surface of the bearing surface 51B at the apex 31A of the upper end 31 of the blade 30, the blade and actuator can slide and move relative to one another. The blade also can move within the slot 51S defined by the lower end 51 of the actuator 50. Optionally, the actuator shaft 50 can spin and circle around the tool longitudinal axis TLA as the tool 10 rotates about that axis. Further, any of the forces F1 and F2 as described below that are transferred from the shaft 12S through the actuator shaft 50 and ultimately to the blade 30, can be transferred through the contact or engagement of the actuator with the blade, and more particularly via the engagement of the bearing face 51B against the upper end 31, apex 31A or another portion of the blade 30.

With reference to FIGS. 1-4, the blade 30 and its cutting edges 41, 42, 43 will be described in more detail. Generally, the blade 30 can include can upper end 31 including surfaces that engage the bearing face 51B, and a lower end 32 which can include one or more cutting edges 41, 42 and 43. Between the upper end 31 and the lower end 32, the blade 30 can define a slot 33. The slot 33 can extend through the blade 30 from one face to an opposing face. The slot 33 can be closed at opposite ends 33A and 33B. The slot 33 can be centered along a second extension axis 2EA that is parallel to the first extension axis EA along which the cutting edges generally move downward and toward the tool longitudinal axis TLA.

As mentioned above, the slot 33 can be configured so that the pins 28 and 29 extend through the first compartment 21 as well as the slot 33. With the pins extending through the slot 33 and the slot generally closed at its ends, the blade can be trapped within the first compartment 21 and not fully removable therefrom. In some cases, the blade 30 can reciprocally move within the first compartment 21 via the pins and slot configuration, or some other configuration.

Optionally, the blade 30 as shown in FIGS. 1-2 can be structured and disposed within the slot 30 so that no portion of the blade extends laterally or radially outward from the two longitudinal axis TLA beyond the exterior 20E of the carrier 20. In this manner, the carrier can rotate within a stabilizer as described further below, without the blade interfering with that rotation or engaging the stabilizer to impair, or prevent rotation of the carrier and or blade within the stabilizer.

As mentioned above, the blade 30 can include a lower end 32, which can project outwardly from the carrier 20, in particular, the lower surface 20L of the carrier different distances D4 and D5 depending on the retracted or extended state of the blade in a plug forming operation. The lower end 32 of the blade optionally can include a first cutting edge 41, a second cutting edge 42 and a third cutting edge 43. While shown with all of these cutting edges present, one or more of them can be deleted. In addition, other cutting edges can be added or subtracted from the blade and yet still form the plug 100 as described herein. In general, the cutting edges can be configured to cooperatively remove material from the donor board to form the donor board groove DBG as well as the plug 100 and its various surface features.

Figure 4:
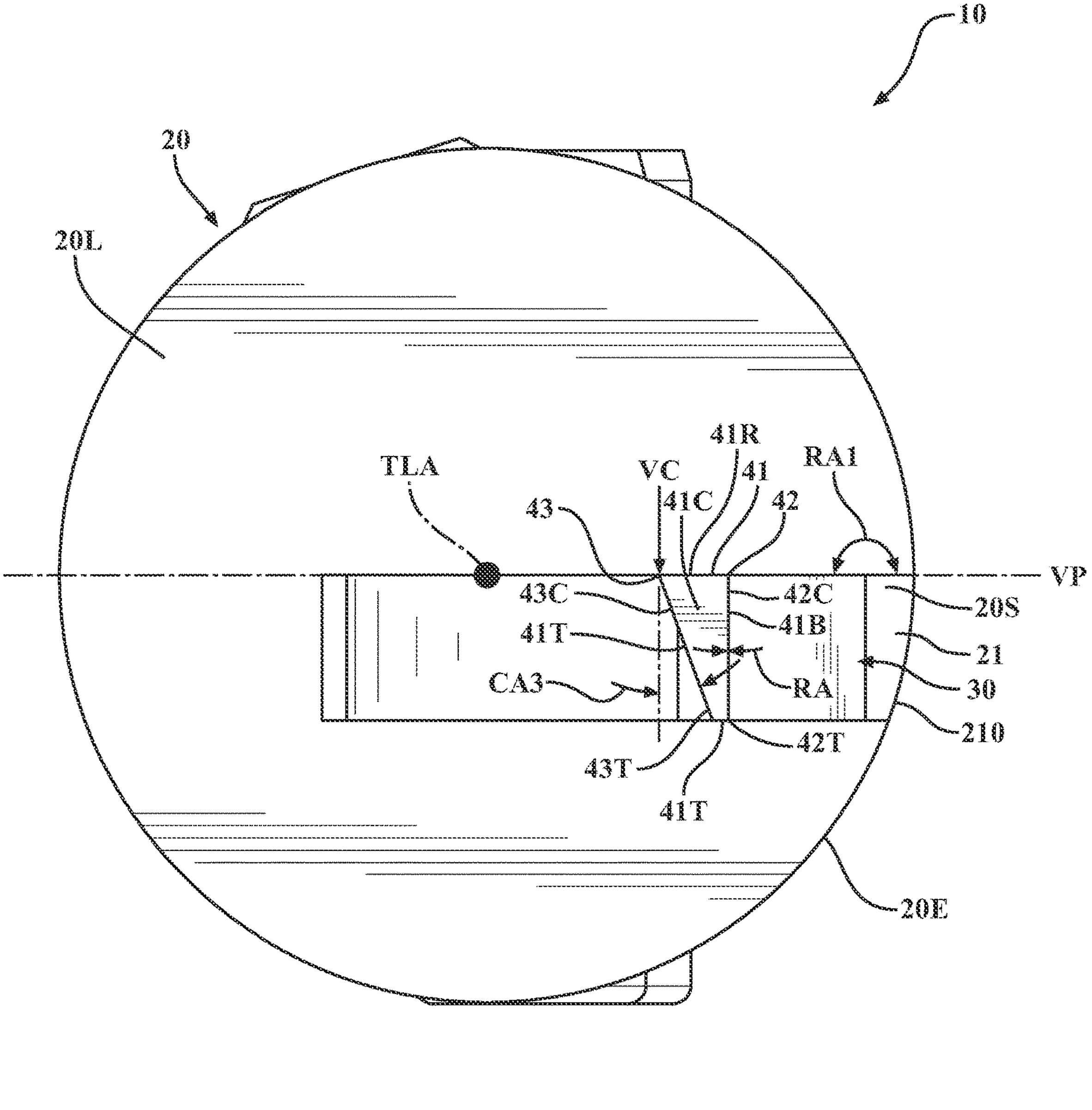
FIG. 4 is a close-up end view of the cutting edge end of the tool in the extended mode showing a first cutting edge and a second cutting edge with a first rake surface therebetween.

As shown in FIGS. 3-4, the first cutting edge 41 can transition to a flank surface. For example, the first cutting edge 41, which penetrates the donor board surface DBF and forms the groove DBG and its bottom B can transition to a first clearance surface 41C and a first rake surface 41R. The first clearance surface 41C can include an inclination that is expressed via a first clearance angle CA1. The first clearance angle CA1 can be the angle that the first clearance surface 41C is offset from a cutting velocity vector or the first cutting plane VC, which can lay optionally in a horizontal plane HP shown in FIG. 3. This first clearance angle CA1 can be optionally 1° to 10°, inclusive; 1° to 7°, inclusive; 1° to 5°, inclusive; 2° to 4°, inclusive; 2° to 3°, inclusive; or about 3° depending on the application. The clearance surface 41C as shown can be flat or planar, but in other applications it can be contoured, concave and/or convex. The first clearance surface 41C can extend from the first cutting edge 41 to the downstream first trailing edge 41T of that clearance surface 41C.

Additionally, first clearance surface 41C can extend to a first bottom edge 41B as shown in FIG. 3 which borders the lower portion of the second clearance surface 42C. The first bottom edge 41B can generally be linear as shown, but alternatively can be curved and/or contoured, concave and or convex. The first clearance surface 41C also can extend inward and include and inner edge 41I which as shown can be linear and can face toward the tool longitudinal axis TLA and generally toward the plug 100 and then the plug side wall 100S as the plug is formed.

The first rake surface 41R can extend upward from the cutting edge 41. The first rake surface 41R as illustrated can be a flat or planar surface, but in other applications it can be contoured, concave and/or convex. The first rake surface can extend vertically upward, generally parallel to but radially offset from the tool longitudinal axis TLA. The first rake surface 41R can form a chip flowing surface, up or along which bottom material BM flows when separated from the bottom B of the groove DBG. This first rake surface can include a first rake angle RA1, which can be the angle that the first rake surface 41R is offset from a plane such as a vertical plane VP or other plane that is perpendicular to cutting velocity vector VC shown in FIG. 4. This first rake angle can be positive or neutral as shown. In some cases, the first rake angle can be optionally 0° when neutral, or optionally, when positive, 1° to 7°, inclusive; 1° to 5°, inclusive; 2° to 4°, inclusive; 2° to 3°, inclusive; or about 2° depending on the application.

Optionally, the first rake surface or first chip flow surface 41R can extend within the vertical plane VP. This vertical plane repeat can be positioned relative to the tool longitudinal axis TLA such that the tool longitudinal axis is coincident with the vertical plane, and lays within the vertical plane. In this condition, the tool longitudinal axis TLA can be parallel to the first rake surface 41R at the forward portion of the blade. In other cases, the first rake surface 41R can be in a different plane, such that the tool longitudinal axis does not pass through, intersect or is not coincident with the plane of that rake surface 41R. This relationship of the rake surface and the tool axis can be modified so that the sidewall of the plug can be formed in different configurations, with different tapers and angles from the plug face to the bottom.

Optionally, although shown as a linear, straight edge, the first cutting edge 41 can be curved or rounded, and optionally can include notches, recesses, projections or teeth depending on the application and the configuration of the donor board groove DBG to be formed around the plug.

As mentioned above, the tool 10, in particular, the blade 130 can include a second cutting edge 42. The second cutting edge 42 can be transverse to the first cutting edge 41. As shown, the second cutting edge 42 can be perpendicular, as shown in FIG. 3, to the first cutting edge 41. The second cutting edge 42 can extend upward from the first cutting edge 41 along an outer knife edge 30E of the blade. The second cutting edge 42 can be flanked and/or transitioned to a second clearance surface 42C. This second clearance surface 42C can extend upward along the knife edge 30E. The second cutting surface 42 can effectively cut and remove material from the donor board groove DBG and in particular, from the groove sidewall GS of that groove DBG.

FIG. 9 illustrates the bottom material BM being removed by the first cutting edge 41 from the bottom B of the donor board groove DBG, and the second cutting edge 42 removing sidewall material GM from the exterior groove sidewall GS as the tool 10 and blade rotate in direction R during a formation of a plug 100. A second clearance surface 42C can extend rearward and downstream from the second cutting edge 42. This clearance surface 42C can be disposed radially farther from the tool longitudinal axis TLA than the second cutting edge 42. As shown, the second clearance surface 42C can be generally planar. Of course, in other applications, it can be contoured, rounded, concave and/or convex. The clearance surface 42C optionally can be offset at a relief angle RA (FIG. 4) from a cutting velocity VC also referred to as a cutting plane that is perpendicular to the rake surface 41R. This relief angle RA can be optionally 0° to 10°, inclusive; 1° to 8°, inclusive; 1° to 8°, inclusive; or other angles depending on the application.

The second cutting surface 42C can extend from the first cutting edge 42 downstream to a second trailing edge 42T opposite the second cutting edge 42. The second trailing edge 42T as shown can be linear, but in other applications might be contoured, concave, rounded and/or convex, depending on the application. The second trailing edge 42T can extend toward and intersect the first trailing edge 41T of the first clearance surface 41C. Optionally, the first clearance surface 41C and second clearance surface 42C can be perpendicular to one another.

With reference to FIGS. 2-4, the tool 10 as mentioned above can include a third cutting edge 43. This third cutting edge 43 can be configured to cut and/or remove material SM from a plug sidewall 100S of the plug 100 as the third cutting edge transitions inward toward the tool axis TLA below the plug face 100PF along the extension axis EA at a plug tapering angle A1. As shown in FIGS. 3 and 4, the third cutting edge 43 can extend transverse to the first cutting edge 41. Optionally, the third cutting edge 43 can be perpendicular to the first cutting edge 41, extending upward in a generally vertical manner from the first cutting edge 41. The third cutting edge 43 can be parallel to the first extension axis EA. The third cutting edge 43 can be flanked by the first rake surface 41R. This first rake surface 41R optionally can form a rake surface for the third cutting edge 43 as well. This rake surface optionally can be positive and/or neutral and can include a positive end or neutral rake angle relative to the plug sidewall 100S while engaged with that side wall to produce a taper or other contour along the side wall or portion of the plug under the plug surface 100PF.

With further reference to FIGS. 3, 4 and 9, the third cutting edge 43 can extend upward from the bottom of the blade or generally upward from the first cutting edge 41 a distance PD. This distance PD can be equal to, greater than or less than the height PH of the plug 100. Thus, this third cutting edge 43 can be configured so that it generally cuts the plug 100 and removes material SM from the sidewall 100S below the plug face 100PF, and generally inward from the outer perimeter or edge of the plug face under that outer perimeter. The cutting edge 43 also can be flanked by a third clearance surface 43C opposite the first rake surface 41R. The third clearance surface 43C can include an inclination that is expressed via a third clearance angle CA3. The third clearance angle CA3 can be the angle that the first clearance surface 43C is offset from a cutting velocity vector or the first cutting plane VC, which can lay optionally perpendicular to the vertical plane VP shown in FIG. 4. This third clearance angle CA3 can be optionally 1° to 30°, inclusive; 1° to 20°, inclusive; 1° to 10°, inclusive; 1° to 7°, inclusive; 3° to 15°, inclusive; 5° to 25°, inclusive; 5° to 20°, inclusive, or about 25° depending on the application. The clearance surface 43C as shown can be flat or planar, but in other applications it can be contoured, concave and/or convex. The third clearance surface 43C can extend from the third cutting edge 43 to the downstream third trailing edge 43T of that clearance surface 43C.

Where the third cutting edge 43 rotates and is located, it can cut and remove sidewall material SM from the plug side wall 100S. Above the plug sidewall and the plug face 100PF, the third cutting edge will not remove material from the plug because it does not engage the plug or the donor board in general. Optionally, in the region above the third cutting edge 43, the blade can include a buttress 37 that can generally reinforce the cutting edge portion 38 of the second or lower end 32 of the blade 30. This buttress portion can generally begin above the plug depth PD of the cutting portion 38 of the blade 30. In the extended mode shown in FIG. 2, more of the buttress portion 37 can be exposed and can extend beyond the lower surface 20L of the carrier 20 than in the retracted mode shown in FIG. 1.

Figure 5:
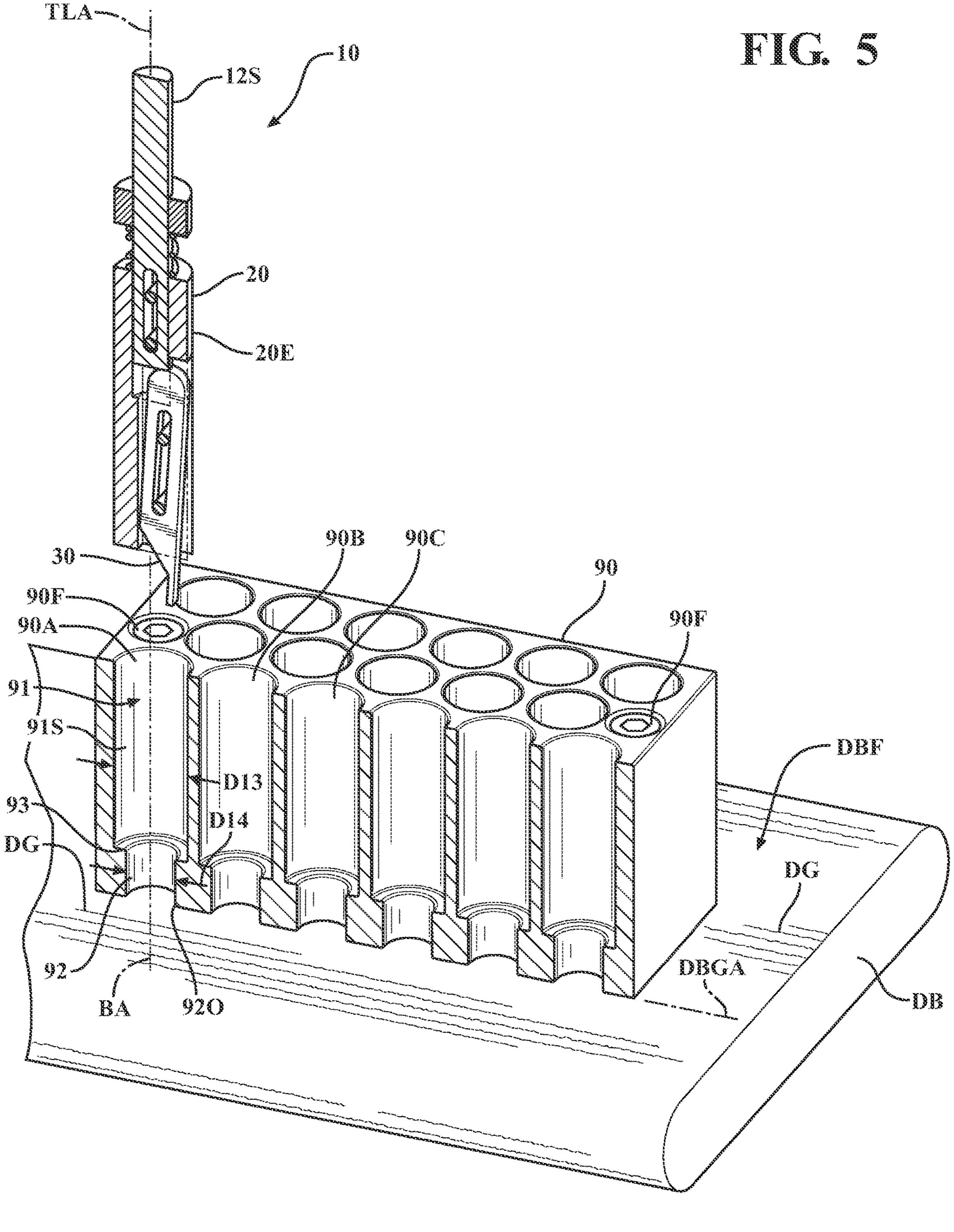
FIG. 5 is a perspective view of the plug cutting tool including a stabilizer in the form of a positioning block to produce plugs from a donor board.

With reference to FIG. 5, the tool 10 optionally can include a stabilizer 90. As shown there, the stabilizer 90 can be in the form of a positioning block having multiple bores 90A, 90B, 90C, etc. These bores can be disposed in an array that can be placed over a donor board DB. For example, the stabilizer, in the form of a positioning block 90 can be fastened down with one or more fasteners 90F and secured to the board DB to align the array with the donor board grain axis DBGA as well as a particular donor board grain DG along the donor board face DBF. The precise location of each of the respective bores can be oriented to retrieve a particular grain, texture, hue or other feature within a plug face of a plug formed with the tool 10 from the donor board DB. The precise number of the individual bores in the stabilizer 90 also can vary, depending on the number of plugs to be produced with the stabilizer, the size of the donor board DB and other factors.

With further reference to FIG. 5, the individual bores can include different features to correspond to features of the carrier 20 and/or blade 30. More particularly, the bore 90A, which can be identical to the other bores of the stabilizer 90, can include a primary bore 91 and a secondary bore 92. The carrier 20 can be inserted into the primary bore 90 and can abut against a shelf or shoulder 93 that extends inwardly toward a bore axis BA from the side wall 91S of the bore 90A. This shelf or shoulder 93 can transition to the lower bore 92 and the bottom opening 92O of the bore. The primary bore 91 can be of a first diameter D13 while the secondary bore 92 can be of a second diameter D14 which is less than the first diameter D13 below the shelf 93. Of course, in some applications, these diameters D13 and D14 could be the same or reversed in dimension.

The tool 10 can be placed so that the tool longitudinal axis TLA aligns with the bore axis BA. The carrier 20 can be placed within the bore 91 such that the exterior surface 20E of the carrier 20 is disposed immediately adjacent the sidewall 91S of the primary bore 91. When fully installed in the bore 91, the blade 30, and in particular the cutting portion 38 can extend downwardly, below the shelf or shoulder 93 and into the secondary bore 92. The tool longitudinal axis TLA can be coincident with and/or parallel with the bore axis BA such that when the carrier and blade are rotated, they commonly rotate about the bore axis and the tool longitudinal axis. Although shown as including a continuous sidewall 91S in the primary board 91, that continuous sidewall 91S can be replaced with guides, fingers and/or tabs which generally can maintain the carrier 20 in a somewhat fixed orientation so the tool longitudinal axis TLA remains aligned with the bore axis BA, and/or so the carrier can rotate within the stabilizer 90.

A method of using the tool 10 of the current embodiment will now be described with reference to FIGS. 5-12. On a high level, the method can include boring a groove DBG in a donor board DB to form a plug 100 including a plug face 100PF, moving a blade 30 along an extension axis EA that is offset at a plug tapering angle A1 relative to a tool longitudinal axis TLA and accordingly a plug longitudinal axis PLA of the plug 100, so that a cutting edge reduces a diameter, dimension and/or cross section of the plug below the plug face 100PF. Optionally, the method includes moving one or more cutting edges toward the tool axis and/or plug axis under the plug face to taper the plug sidewall and plug, or otherwise reduce or remove material from the plug sidewall below the plug face. With the reduced dimension of the plug below the plug face, the plug optionally can be installed in a recipient board hole 100H2 of a recipient board RB initially and/or more easily.

More particularly, the method can include boring a groove DBG in a donor board face DBF with a rotating tool 10 to form a plug 100 centered in the groove, the plug retaining an aesthetic exterior surface of the donor board face DBF, the plug 100 including a plug sidewall 100S and a plug lower portion 102 located below a plug upper portion 101; and advancing at least one cutting edge along a first extension axis EA that is transverse to the tool longitudinal axis TLA, while rotating the tool, to taper the plug so that the plug is inwardly tapered between the plug upper portion and the plug lower portion. As a result, the face 100PF can include a first diameter D1 (which optionally can be a diameter or dimension of an irregular or imperfect circle or rounded shape) greater than a second diameter D2 (which likewise optionally can be a diameter or dimension of an irregular or imperfect circle or rounded shape), wherein the plug face 100PF retains the aesthetic exterior surface above plug sidewall 100S. Of course, in some cases, the edge or perimeter of the plug face can be slightly marred or scuffed.

Figure 6:
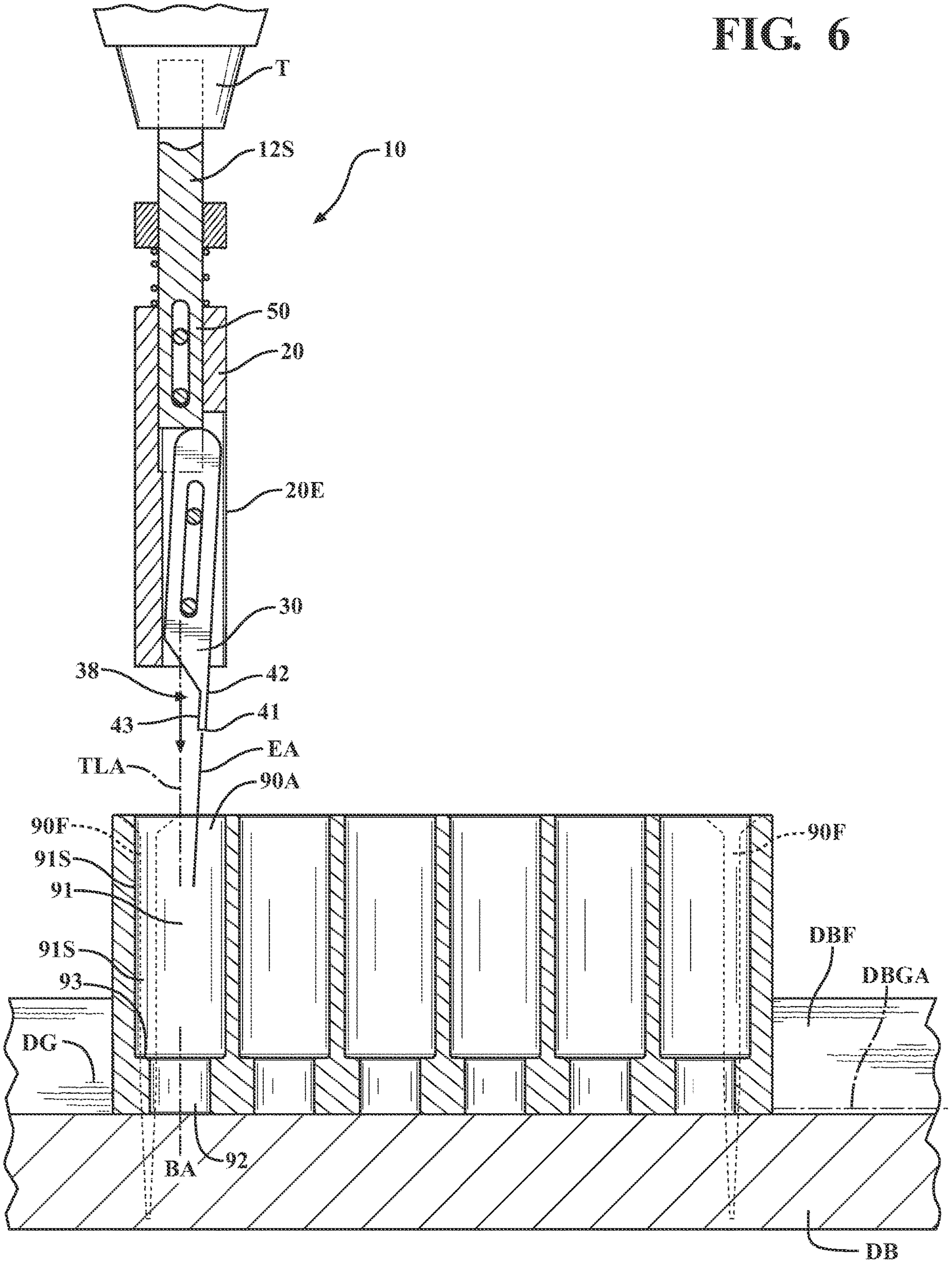
FIG. 6 is a side partial section view of the tool with the stabilizer secured in place with fasteners, with a blade including the first and second cutting edges in a retracted mode and about to be installed in a bore of the positioning block above a donor board face.

Even more particularly, turning to FIG. 6, the tool 10, connected to a rotational tool T, such as a drill, can be moved toward a donor board DB having a donor grain DG and a donor board grain axis DBGA that is generally parallel to the length of the board and/or the donor grain DG. The tool 10 can include the stabilizer 90, optionally fastened to the donor board DB via the fasteners 90F and fixed in position relative to the donor board grain DG and the donor board DB in general. The user can align the tool longitudinal axis TLA with the bore axis BA. This also can align the exterior 20E of the carrier 20 with the bore sidewall 91S.

A user can fit the carrier within the bore 91 and advance the carrier downward toward the shelf 93 of the bore 91 as shown in FIG. 7. There, the lower surface 20L of the carrier 20 can engage the shelf 93 such that the carrier does not advance any farther into the bore 91. The cutting edge portion 38 of the blade 30 can project into the secondary bore 92 below the shelf 93. The remainder of the blade 30 can remain above the shelf and within the primary bore 91. A portion of the carrier 20 can extend upwardly, above the upper surface of the stabilizer 90.

Placing the carrier in the bore can provide a stable and solid orientation of the blade 30 relative to the donor board face DBF. This also can orient the tool longitudinal axis TLA generally orthogonal to the donor board face DBF for a consistent and orthogonal boring of a donor board groove DBG. The drill T can be actuated to rotate the shaft 12S in direction R. This in turn rotates the blade 30 and the respective cutting edges 41, 42 and 43 about the tool longitudinal axis TLA.

The first cutting edge 41 can be disposed adjacent the donor board face DBF and ready to penetrate through the aesthetic exterior surface of that donor board face, circumscribing, outlining or otherwise boring a groove around a plug face 100PF. This is shown in FIG. 8, where a user can exert a force F1 on the tool 10 which can transfer to the shaft 12S which of course is connected to the actuator shaft 50. As the actuator shaft 50 moves downward toward the donor board face DBF, the bearing face 51B engages the upper end 31 of the blade 30. As this occurs, the actuator shaft 50 moves relative to the pins 58 and 59. The pins slide within the slot 53 defined by the actuator shaft as the shaft moves downward. The spring 14S is also compressed via the collar 14C pushing it against the upper surface 20U of the carrier 20.

With further reference to FIG. 8, the bearing surface 51B exerts a force F2 commensurate with force F1 against the blade 30 and moves it downward in direction M. As this occurs, the tool continues to rotate in direction R. The blade 30 and the respective cutting edges 41, 42 and 43 also rotate about the tool axis TLA, and begin to penetrate the donor board face. This begins to form the donor board groove DBG about the sidewall 100S of the plug 100, generally below the plug face 100PF and the donor board face DBF.

As shown in FIG. 8, the first cutting edge 41 engages and begins to penetrate the donor board face DBF (moving from the exterior of the board to an interior of the board) and begins to bore a groove DBG around a plug 100 and plug face 100PF. Of course, the plug face retains the aesthetic exterior surface and/or grain of the plug, for example, the plug grain PG, as this occurs. This plug grain PG of the plug to be created can be consistent with and can match the donor board grain DG. As mentioned above, the first cutting edge 41 cuts downward, forming a bottom of the groove. This bottom of the groove, however, forms inwardly and toward the tool longitudinal axis TLA and the bore axis BA as well as the plug longitudinal axis PLA. This is because the blade 40 is guided inwardly by the components of the tool along the first extension axis EA. As this occurs, the cutting edges move from a greater distance D6 (FIG. 1) to a lesser distance D7 (FIG. 2) toward the plug longitudinal axis PLA, and the tool longitudinal axis TLA, while the cutting edges move along the first extension axis EA.

As a result, the third cutting edge 43 moves inward, toward the axes TLA, PLA, as the edge rotates around those axes. Due to its cutting features on the clearance surface, the cutting edge 43 removes plug sidewall material SM from the plug sidewall 100S, thereby tapering and/or reducing the overall dimension of the plug from a first diameter D1 to a second diameter D2 as the blade 30 continues to extend in direction M and rotate in direction R about the tool longitudinal axis TLA as further shown in FIG. 9. The cutting edge 43 also can angle generally toward or transverse to the plug longitudinal axis PLA as it extends. In so doing, the edge 43 moves inward and under the plug face 100PF, without removing substantial material from the edge of that plug face. The aesthetic exterior elements, for example, the plug grain, hue and color on the plug face, thus is uncompromised even though another portion of the plug below the donor board face is cut or removed from the donor board. Further, the plug sidewall can be formed via the cutting edge 43 moving along the inwardly angled extension axis EA so that it attains a frustoconical or conical shape below the plug face 100PF, where the shape decreases in dimension below the face. This shaping can be done via the blade and edges moving through the donor board face and then into the underlying or internal material of the donor board. The blade and the cutting edges can extend the plug depth PD to establish the plug height PH of the plug, which extends from the plug face 100PF to the plug bottom 100B. The depth of the groove DBG also can correspond to the plug height PH.

The third cutting edge, as mentioned above, can remove the plug sidewall material SM from the plug side wall 100S. The bottom material BM can be removed from the bottom B of the donor board groove DBG via the first cutting edge 41. The second cutting edge 42 can remove sidewall material GM from the exterior groove sidewall GS of the groove DBG. These various materials that are removed from the groove can be evacuated upward and into the bore void 90V.

Optionally, downward movement of the blade 30 can be terminated via the upper pin 29 engaging the end of the slot 33 of the blade. In turn, this can prevent the cutting edges from extending beyond the plug depth PD. As mentioned above, a particular plug depth can be selected depending on the suitable plug height PH of the plug 100. As a result, this ceases the first cutting edge 41 from increasing the depth of the groove and thus increasing the overall plug height PH of the plug. This plug height PH optionally can be at least 0.150 inches, at least 0.200 inches, at least 0.250 inches, at least 0.300 inches, at least 0.350 inches or other heights depending on the application. The plug 100 also can include a first diameter D1 at the plug face 100PF, which optionally can be at least 0.300 inches, at least 0.275 inches, at least 0.250 inches or other dimensions depending on the application. The plug 100 can further include a second diameter D2 at the plug bottom 100B or generally along the lower portion 102 of the plug. This second diameter D2 is less than the first diameter D1 when the blade 30 ceases downward movement in the donor board groove DBG.

FIG. 9 illustrates the boring of the donor board groove DBG into the donor board face DBF of the donor board DB. There, the first cutting edge 41 removes material BM first from the donor board face DBF, then, as the cutting edge advances past the donor board face, the first cutting edge 41 removes material from the bottom B of the groove DBG as the groove is formed. This in turn deepens the groove, which optionally can be of an annular or ring shape around the plug 100 as shown. This material BM can be evacuated upward, along the rake surface 41R. Optionally, the blade and cutting edges can be configured to first engage the donor board face, then the material of the donor board under the donor board face, rather than the other way around, coming from under the donor board face through the board and eventually later penetrating the donor board face.

Further, as shown in FIG. 9, as the bit rotates, the second cutting edge 42 can engage the exterior groove sidewall GS to remove material GM from the groove sidewall and from the donor board DB surrounding the donor board groove DBG in general. This material also can be evacuated into the void 90V of the stabilizer 90.

With further reference to FIG. 9, the third cutting edge 43 is guided by the pins 28, 29 engaging the slot 33 of the blade along the first extension axis EA transverse to and generally toward the tool longitudinal axis TLA and the plug longitudinal axis PLA. This guidance along the first extension axis causes the third cutting edge 43 to move under the plug face 100PF yet toward the axis TLA, without removing more material from the plug face 100PF or generally around the edge of that plug face. This occurs even though the edge 43 is being moved inwardly toward the axis under that plug face. Generally, the plug includes a plug longitudinal axis PLA that can extend orthogonal to the plug face 100PF and/or the donor board face DBF during the boring of the donor board groove DBG as mentioned above.

During the extension of the blade along the extension axis EA toward the plug longitudinal axis PLA, the carrier and blade can continue to rotate. As this occurs, the second cutting edge 42 optionally does not widen and/or expand the groove DBG, and that groove can optionally maintain a consistent groove thickness GT from the plug face 100PF or the groove perimeter edge 107E to the bottom B of the groove DBG.

Again, the tool 10 can be advanced along the first extension axis EA, with the blade and cutting edges rotating about the tool longitudinal axis TLA and about the plug longitudinal axis PLA, so that the portion of the plug below the plug face 100PF is tapered, in either a uniform or nonuniform manner, from that plug face toward the plug bottom 100B. In extreme cases, the cutting edge 43 can cut completely through the bottom or lower portion of the plug so that the plug is conical or frustoconical in shape from the plug face downward toward the lower portion 102 of the plug.

After a user has removed material from the plug 100 below the plug face 100PF with the third cutting edge, and there is a sufficient taper, step or reduced dimension below the plug face 100PF, the user can cease rotation of the tool 10 about the tool longitudinal axis. After the donor board groove DBG is established around the plug 100, the plug 100 can be considered to have been produced. The user can remove the cutting edges and blade from the donor board groove DBG and generally from the produced plug 100. The user can remove the carrier 20 and tool 10 in general from the first bore 90A.

Assuming additional plugs are to be produced, the user can then reinstall the carrier, blade and cutting edges in the next bore 90B and repeat the process. The user can then repeat the removal and reinstallation of the carrier and blade relative to each of the respective bores in the array of the stabilizer 90. The user can thus produce a multitude of plugs 100 using the tool as shown for example in FIG. 10. This process can be repeated multiple times on a job site, to produce multiple plugs, again optionally from scrap, donor boards on a job site, where those donor boards have similar grains, textures, hues and colors as recipient boards into which plugs produced with the tool and methods herein can be installed.

As mentioned above, after the tool 10 and methods of the current embodiments are used to produce one or more plugs from a donor board, those plugs 100 can be removed from the donor board using a screwdriver, picker or the tool mentioned in the above noted co-pending application. From there, the plugs can be installed relative to respective holes in a recipient board RB as shown in FIGS. 11 and 12. In particular, as shown in FIG. 11, the plug 100 there can be installed at least partially in the plug hole 100H2. This installation can be accomplished via hand or a tool. The plug grain PG in the plug grain axis PGA can be aligned with and/or parallel to the recipient board grain axis RBGA and generally can match the recipient grain RG. The plug face 100PF can be disposed a slight distance D10 above the recipient board face RBF. The plug bottom 100B can be disposed that distance or greater above the top of the fastener 105. With the plug only partially installed in this manner, a user can view the plug grain PG, and optionally compare it to the recipient board grain RG to confirm they are aligned. If not, the user can grasp the plug and rotate it about the plug longitudinal axis to align the plug grain and recipient board grain.

With the plug 100 produced with the current tool embodiment, to further install the plug 100, the user can take a tool, such as a hammer or other pounding device H as shown in FIG. 11 and move it in direction N to strike the plug face 100PF, thereby driving the plug 100 farther into the hole 100H2. As this occurs, the plug grain PG remains aligned with the recipient board grain RG along with their respective axes. The plug sidewall 100S also engages the hole sidewall HS and optionally the hole edge HE as the plug is forced farther into the hole, with the bottom 100B approaching the head 105F of the fastener 105.

Optionally, the plug can be tapped or pounded several times with the tool H until the plug is satisfactorily installed in the plug hole 100H2, over the fastener 105 as shown in FIG. 12. There, the plug face 100PF is flush with the receiving board face RBF of the receiving board RB. The plug grain axis PGA also is aligned with and/or parallel to the receiving board grain axis RGA. This can provide a clean and consistent aesthetic appearance of the recipient board face, with the plug face 100PF barely or not at all visible or distinguishable from the remainder of the recipient board face RBF.

Figure 14:
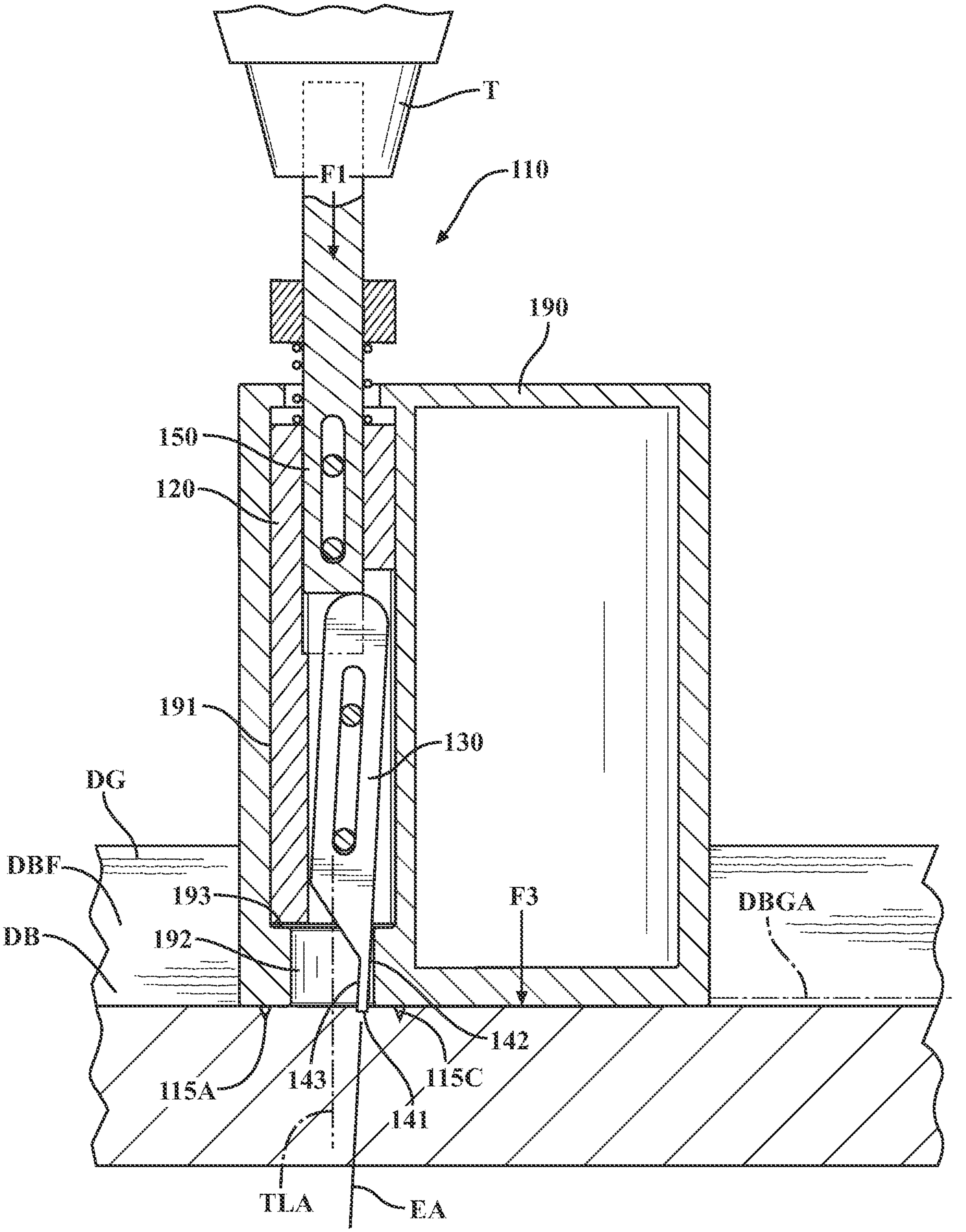
FIG. 14 is a side partial section view of the tool with the stabilizer in place, engaging a donor board with one or more teeth, with a blade including the first and second cutting edges in a retracted mode and initially engaging a donor board face.
Figure 15:
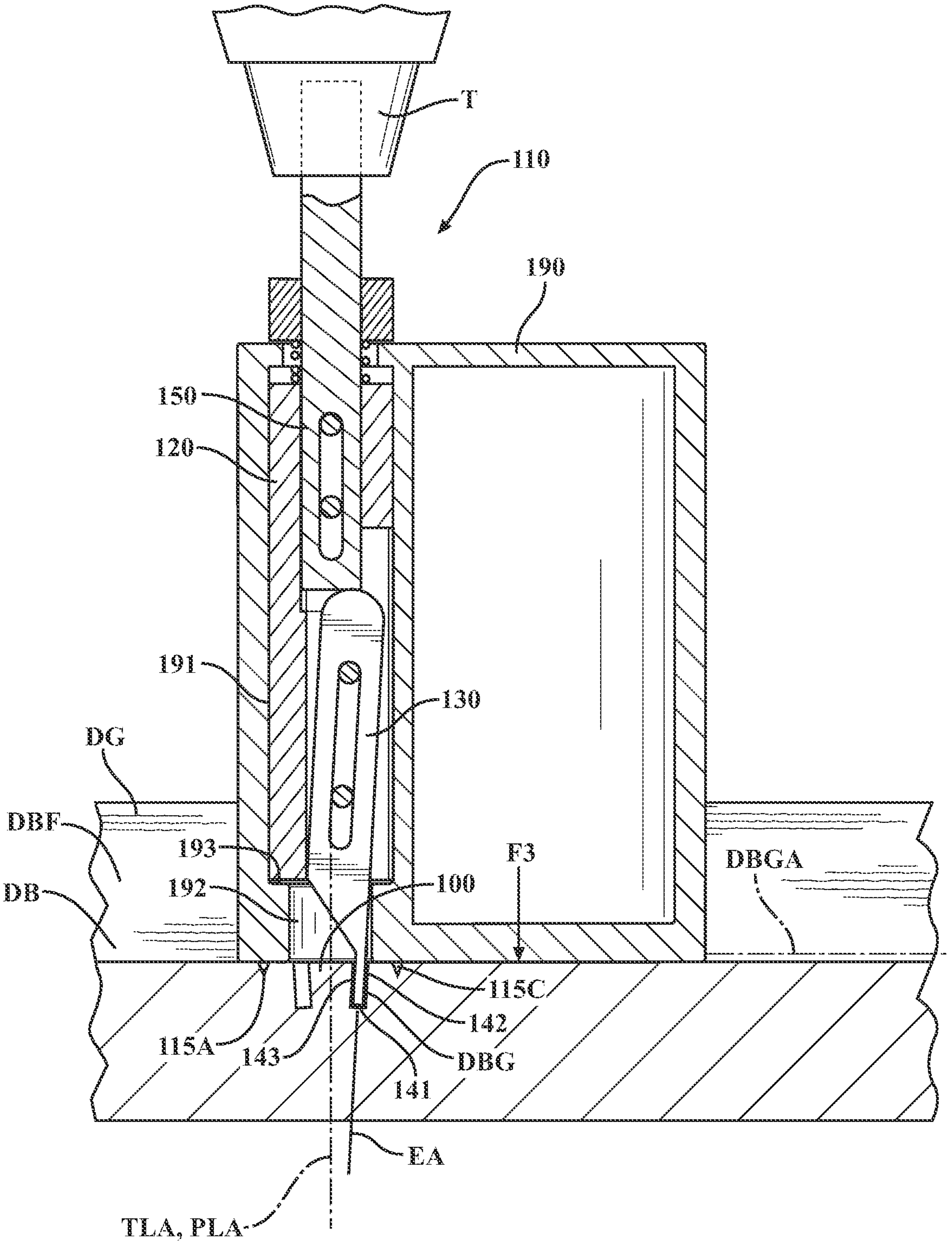
FIG. 15 is a side partial section view of the tool with the stabilizer in place, with the blade including the first and second cutting edges in an extended mode producing an outer groove sidewall and a plug generally having a tapered plug sidewall from the donor board.

A first alternative embodiment of the tool is shown in FIGS. 13-15 and generally designated 110. This tool can be identical or similar to the current embodiment described above in structure, function and operation with several exceptions. For example, this tool 110 can include a carrier 120, a blade 130 and actuator shaft 150, all of which can be identical to those components in the embodiment above. The blade 130 also can include respective cutting edges 141, 142 and 143 all of which can be identical to those components in the embodiment above. In this embodiment, however, the tool 110 can include a stabilizer 190 that is joined with and/or attached to the carrier 130 and remainder of the tool 110. Thus, the carrier 120 and the respective components thereof is not moved into and out of various holes in a positioning block as with the embodiment above.

As shown in FIG. 13, the stabilizer 190 can include a handle portion 198. The handle portion can be in the form of a rounded and/or elongated handle. As will be appreciated, the stabilizer 190 thus can be grasped by a user's hand without hurting or damaging the user's hand, all while the blade 130 is extended from the stabilizer and used to construct a plug 100 as described above and below. The handle portion can define a bore 190A within which the carrier 120 can be disposed. The stabilizer 190 can include a primary bore 191 and a secondary bore 192 below a shelf 193, similar to the stabilizer 90 in the embodiment above. The carrier 120 can be rotationally disposed in the primary bore 191 while the blade 130 and the cutting edges 141, 142, 143 can partially extend into the secondary bore 192.

In this embodiment, the stabilizer 190 can be configured so that it can be pressed against the donor board and held by a user while the carrier is rotated and the cutting edges remove material from the donor board. Optionally, the stabilizer 190 can be used to center and hold the carrier and blade while these components rotate relative to a donor board DB, and in particular a donor board face DBF. To do so, the stabilizer can be outfitted with one or more gripping elements, in the form of teeth 115A, 115B and 115C. As shown in FIG. 13, these teeth can project downwardly from the lower surface 190L of the stabilizer 190. The teeth can protrude from the lower surface by distance DT, which can be optionally between 0.001 and 0.100 inches, inclusive, between 0.010 and 0.050 inches, inclusive, between 0.020 and 0.040 inches, inclusive, between 0.020 and 0.300 inches, or other distances depending on the application.

The teeth, for example, the tooth 115A can extend outward from the lower surface 14L and can be of a generally conical and/or pointed shape, terminating at a tip or 115AT. This tip 115AT can be conical and/or rounded. This tip 115AT can engage and press into or slightly penetrate a surface, such as a donor board face DBF of a donor board DB when the stabilizer is placed against the donor board face DBF, for example as shown in FIG. 14. There, the teeth 115A-115C can engage against the donor board face DBF, without being easily moveable relative thereto. In some cases, the conical or pointed tips of the teeth can include an acute angle TA, so that the tips can sufficiently engage or poke into or penetrate donor boards that are constructed from harder or more dense materials.

The number of teeth 115A-115C on the stabilizer 190 can vary, but as shown, there can be three teeth. In this configuration, the teeth are roughly separated by 120 degrees from one another and arranged in an array around the tool longitudinal axis TLA. The teeth in this configuration can function as a tripod to impair, inhibit and/or prevent (all referred to as impair herein) rocking or tipping of the stabilizer 190 relative to a donor board face DBF. Of course, additional teeth can be included on the lower surface 190L, such as 4, 5, 6 or more teeth. With these teeth counts, however, the even number of teeth may in some cases cause the stabilizer to rock, which in turn can reduce the stability of the tool relative to the donor board DB and donor board face DBF as the bit is used to construct the respective plug and plug groove. Optionally, the teeth 115A, 115B and 115C can be disposed radially outward from the tool longitudinal axis TLA and from the blade 130 as it rotates. The teeth further optionally can surround the rotating blade 130 and secondary bore 192, extending in at least three different directions away from the tool longitudinal axis.

Further optionally, each of the teeth 115A, 115B and 115C can be and/or can form a portion of a fastener that is secured or fastened relative to the remainder of the handle of the stabilizer. Each of the teeth optionally can be constructed from a metal, such as steel. Of course, in other applications, each of the teeth can be constructed from a composite, polymeric or other material. In some cases, the teeth can be substituted with another structure, such as an elastomeric pad or some other type of polymeric foot that radially extends around or adjacent at least a portion of the blade 130 as the blade rotates relative to the stabilizer 190.

The tool 110 can be used in a method virtually identical to that of the tool 10 of the current embodiment as described above. In general, as shown in FIG. 14, the stabilizer 190 can be placed against the donor board DB. The teeth 115A-115C can penetrate slightly into the donor board phase, thus providing a stable temporary connection, engagement or fixation of the stabilizer relative to the donor board. The user can exert the force F3 downward to enhance that temporary connection or engagement of the stabilizer to the donor board to further prevent or impair wobbling or walking of the blade and cutting edges relative to the donor board face DPF as the blade and cutting edges begin and continue to cut into the donor board to form the plug 100. In particular, as the blade 130 is advanced into the donor board DB, the user maintains contact of the teeth or the stabilizer or some gripping element thereof with the donor board face DBF. Again, this can impair the blade and the respective cutting edges from walking and or moving along the donor board face DBF, but still allows the blade 130 to rotate about the tool longitudinal axis TLA as the respective cutting edges penetrate and bore the donor board groove DBG into the board.

As with the embodiment above, as shown in FIG. 15, the blade 130 and cutting edges 141, 142 and 143 can bore the groove DBG in the donor board DB thereby forming a plug 100 circumscribed by the groove. The stabilizer again can be held in place with the teeth 115A-115C as the blade and cutting edges form the plug. After the plug is formed, the blade can be retracted, and the stabilizer 190 can be removed from the donor board face. Of course, other constructions are contemplated to constrain the carrier and blade as those elements rotate about the tool longitudinal axis and the plug longitudinal axis, with the blade advancing along the first extension axis EA to form the tapered side wall of the plug 100.

The following additional statements about other current embodiments are provided, the lettering of which is not to be construed as designating levels of importance.

Statement A. A method of producing a plug for installation in a board, the method comprising: rotating a tool, including a first cutting edge about a tool longitudinal axis; boring a groove below a donor board face with the first cutting edge to form a plug that retains an aesthetic exterior surface along a plug face, the plug including a plug sidewall facing the groove; and advancing the first cutting edge along a first extension axis that is transverse to the tool longitudinal axis, while rotating the tool, to taper the plug so that the plug is inwardly tapered below the plug face.

Statement B. The method of Statement A, wherein the plug face includes a first dimension greater than a second dimension of a plug bottom below the plug face.

Statement C. The method of any of the preceding Statements wherein the first extension axis is offset relative to the tool longitudinal axis by an offset angle of at least 1 degree to 35 degrees, inclusive.

Statement D. The method of any of the preceding Statements, wherein the carrier is rotatably disposed in a stabilizer, the stabilizer surrounding the carrier and blade, and configured to remain stationary while the blade and cutting edges rotate about the tool longitudinal axis.

Statement E. The method of any of the preceding Statements wherein the stabilizer comprises a plurality of teeth extending from a lower surface of the stabilizer, the plurality of teeth configured to engage a donor board face of the donor board to impair the blade and/or cutting edge from wobbling relative to the donor board face as the first cutting edge bores the groove.

Statement F. The method of any of the preceding Statements, comprising: advancing an actuator bar within the carrier to engage the blade and advance the cutting edge below a lower surface of the carrier, in a direction inward toward the longitudinal axis.

Statement G. The method of any of the preceding Statements, comprising a second cutting edge transverse to the first cutting edge; a second clearance surface adjacent the second cutting edge, the second cutting edge configured to remove material from an outer groove sidewall of the groove.

Statement H. The method of any of the preceding Statements, wherein the second clearance surface extends a second distance upward from the first cutting edge, wherein the second clearance surface terminates at a second clearance surface upper end.

Statement I. The method of any of the preceding Statements comprising: installing the carrier in a bore of a stabilizer in the form of a positioning block secured with fasteners to the donor board, and rotating the carrier in the bore while extending the blade along an extension axis below a bottom surface of the positioning block, inward toward the tool longitudinal axis.

Statement J. The method of any of the preceding Statements wherein the cutting edge is adjacent a rake surface, wherein the rake surface is disposed in at least one of a neutral rake angle and a negative rake angle.

Statement K. The method of any of the preceding Statements, wherein the tool includes a handle, wherein the carrier is advanced in a bore defined by the handle toward the donor board face to bore the groove in the donor board.

Statement L. The method of any of the preceding Statements, comprising penetrating the donor board face with a first cutting edge, which cutting edge is adjacent a first cutting edge clearance surface having a first clearance angle of 1 degrees to 35 degrees, inclusive; advancing the first cutting edge into the donor board to form a plug including a plug face having the donor board grain, a plug sidewall, and a plug bottom, the plug bottom being connected to the donor board; and angling the cutting edge along a path toward the tool longitudinal axis to remove material from the plug sidewall under the plug face in an inwardly tapering manner.

Statement M. The method of any preceding Statement comprising removing the plug from the substrate to produce a hole in the substrate where the plug was located, whereby the plug retains the donor board grain on the plug face.

Statement N. The method of any preceding Statement comprising: inserting the plug in a recipient board having a recipient board grain; and rotating the plug to align the donor board grain of the plug face with the recipient board grain.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A plug cutting tool configured to produce plugs having an aesthetic exterior surface common to a donor board from which the plug is produced, the tool comprising:

a tool longitudinal axis;

a carrier defining a first compartment; and a blade reciprocally disposed in first compartment, the blade including a first cutting edge configured to extend along a first extension axis transverse to the tool longitudinal axis as the blade rotates about the tool longitudinal axis, wherein the first cutting edge moves closer to the tool longitudinal axis as the first cutting edge moves away from the carrier along the first extension axis, wherein the first cutting edge is configured to advance into the donor board face to produce a groove surrounding a plug having a plug face, a plug bottom, and a plug sidewall inwardly tapered from the plug face to the plug bottom so that the plug face has a greater dimension than the plug bottom.

2. The tool of claim 1, wherein the first extension axis is offset from the tool longitudinal axis by a plug tapering angle that is 1° to 15°, inclusive.

3. The tool of claim 2, wherein the plug tapering angle is 1° to 5°, inclusive.

4. The tool of claim 1, wherein the blade is operable in a retracted mode in which the first cutting edge is proximal the first compartment and disposed a first distance from the tool longitudinal axis, wherein the blade is operable in an extended mode in which the first cutting edge is disposed distal from the compartment and disposed a second distance from the tool longitudinal axis, wherein the first distance is greater than the second distance.

5. The tool of claim 4, wherein the carrier includes a carrier lower surface, wherein in the retracted mode the first cutting edge is proximal the carrier lower surface and disposed a third distance from the carrier lower surface, wherein in the extended mode the first cutting edge is distal from the carrier lower surface and disposed a fourth distance from the carrier lower surface, wherein the fourth distance is greater than the third distance.

6. The tool of claim 4 comprising:

an actuator shaft reciprocally disposed in a second compartment defined by the carrier, wherein the actuator shaft includes a bearing face that engages the blade to move the blade relative to the carrier so that the first cutting edge moves from a third distance from a carrier lower surface to a fourth distance from the carrier lower surface as the first cutting edge moves along the first extension axis, wherein the fourth distance is greater than the third distance.

7. The tool of claim 1, wherein the first cutting edge is disposed opposite a second cutting edge along the blade, wherein the first cutting edge is configured to form a plug sidewall below the plug face as the tool rotates about the tool longitudinal axis, wherein the second cutting edge is configured to form an exterior groove sidewall below the plug face as the tool rotates about the tool longitudinal axis.

8. The tool of claim 1 comprising:

a pin extending through a slot defined by the blade, wherein the slot includes a slot axis, wherein the slot axis is parallel to the first extension axis.

9. The tool of claim 1, wherein the carrier includes an upper portion and a lower portion, wherein the lower portion extends to a carrier lower surface, wherein the first compartment is contiguous with the carrier lower surface so that the first compartment forms a lower slot along the carrier lower surface, wherein the blade extends through the slot in an extended mode.

10. The tool of claim 1 comprising:

an actuator shaft reciprocally disposed in a second compartment defined by the carrier, the actuator shaft including a bearing face that engages the blade to move the first cutting edge along the first extension axis;

a first clearance surface that flanks the first cutting edge; and a first rake surface that flanks the first cutting edge opposite the first clearance surface, the first rake surface being perpendicular to a first cutting plane, wherein the first clearance surface is disposed at a first clearance angle of 1° to 35°, inclusive, relative to the first cutting plane.

11. A plug cutting tool configured to produce plugs having an aesthetic exterior surface common to a donor board from which the plug is produced, the tool comprising:

a tool longitudinal axis;

a carrier that rotates about the tool longitudinal axis; and a blade joined with the carrier, the blade including a first cutting edge moveable along a first extension axis transverse to the tool longitudinal axis as the blade rotates about the tool longitudinal axis, wherein the first cutting edge moves closer to the tool longitudinal axis as the first cutting edge bores a groove in a donor board, whereby the first cutting edge is configured to advance into the donor board to produce the groove surrounding a plug having a plug face, a plug bottom, and a plug sidewall inwardly tapered from the plug face to the plug bottom so that the plug face has a greater dimension than the plug bottom.

12. The tool of claim 11, wherein the first extension axis is offset from the tool longitudinal axis by a plug tapering angle that is 1° to 15°, inclusive.

13. The tool of claim 11, wherein the blade is journalled in a first carrier slot extending downward toward a carrier lower surface along the tool longitudinal axis, wherein the blade is constrained to move along the first extension axis within the first carrier slot via at least one pin.

14. The tool of claim 12, wherein the blade defines a first blade slot, wherein the pin extends through the first blade slot and within the first carrier slot.

15. The tool of claim 11, comprising:

an actuator shaft reciprocally disposed in a second compartment defined by the carrier, the actuator shaft including a bearing face that engages the blade to move the first cutting edge along the first extension axis.

16. The tool of claim 15, wherein the blade includes an upper blade end and a lower blade end, wherein the lower blade end includes the first cutting edge, wherein the upper blade end includes a rounded interface, wherein the actuator shaft includes a lower actuator shaft end that is configured to engage the upper blade end and move along the rounded interface.

17. The tool of claim 11, wherein the first cutting edge is flanked by a first rake surface and an opposing clearance surface, wherein the first rake surface is coextensive with a first plane, wherein the tool longitudinal axis lays in the first plane.

18. A method of producing a plug for installation in a board, the method comprising:

rotating a tool, including a cutting edge about a tool longitudinal axis;

engaging the cutting edge against a donor board to penetrate a donor board face of the donor board, the donor board face including an aesthetic exterior surface;

boring a groove below the donor board face with the cutting edge, the plug retaining the aesthetic exterior surface along a plug face in a plug upper portion, the plug including a plug sidewall facing the groove, and a plug lower portion located below the plug upper portion; and advancing the cutting edge along a first extension axis that is transverse to the tool longitudinal axis, while rotating the tool, to taper the plug so that the plug is inwardly tapered between the plug upper portion and the plug lower portion, wherein the plug face includes a first dimension greater than a second dimension of the plug lower portion.

19. The method of claim 18 comprising:

moving an actuator shaft within a carrier, the actuator shaft including a bearing face, so that the bearing face engages a blade to move the cutting edge along the first extension axis.

20. The method of claim 18 comprising:

moving the cutting edge toward the tool longitudinal axis below a carrier and below the plug face as the cutting edge advances farther into the donor board below the plug face, wherein the first extension axis is offset from the tool longitudinal axis by a plug tapering angle that is 1° to 15°, inclusive.

* * * * *